United States Patent
Rugeland et al.

(10) Patent No.: US 10,904,813 B2
(45) Date of Patent: Jan. 26, 2021

(54) METHOD FOR NEIGHBOUR CELL RESELECTION WITH AN AREA OFFSET VALUE

(71) Applicant: Telefonaktiebolaget LM Ericsson (publ), Stockholm (SE)

(72) Inventors: Patrik Rugeland, Stockholm (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/462,621

(22) PCT Filed: Jan. 9, 2018

(86) PCT No.: PCT/SE2018/050013
§ 371 (c)(1),
(2) Date: May 21, 2019

(87) PCT Pub. No.: WO2018/143862
PCT Pub. Date: Aug. 9, 2018

(65) Prior Publication Data
US 2019/0281524 A1    Sep. 12, 2019

Related U.S. Application Data

(60) Provisional application No. 62/452,377, filed on Jan. 31, 2017.

(51) Int. Cl.
*H04W 36/30* (2009.01)
*H04W 48/16* (2009.01)
*H04W 48/20* (2009.01)

(52) U.S. Cl.
CPC ........... *H04W 36/30* (2013.01); *H04W 48/16* (2013.01); *H04W 48/20* (2013.01)

(58) Field of Classification Search
CPC .................................................. H04W 36/30
(Continued)

(56) References Cited

U.S. PATENT DOCUMENTS 9,008,659 B1    4/2015  Choi et al.
2010/0228859 A1 *  9/2010  Backstrom ............ H04W 48/04
                                                    709/225
(Continued)

OTHER PUBLICATIONS

Kolehmainen, Niko; Puttonen, Jani; Henttonen, Tero; Kaikkonen, Jorma; Performance of Idle Mode Mobility State Detection Schemes in Evolved UTRAN (Year: 2010).*
(Continued)

*Primary Examiner* — Peter G Solinsky
(74) *Attorney, Agent, or Firm* — Sage Patent Group

(57) ABSTRACT

A method performed by a wireless device for deciding whether or not to reselect to a neighbor cell is provided. The wireless device is associated with a first cell. The wireless device is further associated with an area, which area is related to any one or more out of: a Tracking Area, TA, multiple TAs, a Radio Access Network, RAN, area. The area comprises one or more cells including the first cell. The wireless device obtains an indication of an area offset related to neighbor cell channel quality. The area offset is associated with said area. The wireless device applies the area offset when the neighbor cell is outside said area. The wireless device then decides whether or not to reselect to the neighbor cell based on the applied area offset.

20 Claims, 8 Drawing Sheets

Method in wireless device 120

(58) Field of Classification Search
USPC .......................................................... 370/332
See application file for complete search history.

(56) References Cited

U.S. PATENT DOCUMENTS

| | | |
|---|---|---|
| 2011/0216732 A1 | 9/2011 | Maeda et al. |
| 2013/0188499 A1* | 7/2013 | Mach .................... H04W 48/20 |
| | | 370/252 |
| 2014/0031039 A1 | 1/2014 | Jung et al. |
| 2014/0302853 A1 | 10/2014 | Militano et al. |
| 2015/0050934 A1 | 2/2015 | Jung et al. |
| 2015/0245263 A1* | 8/2015 | Cho ...................... H04W 36/22 |
| | | 370/331 |
| 2015/0327133 A1* | 11/2015 | Yiu ....................... H04W 48/20 |
| | | 455/436 |
| 2017/0257874 A1* | 9/2017 | Ma ..................... H04W 72/0473 |

OTHER PUBLICATIONS

International Search Report and Written Opinion of the International Searching Authority for PCT International Application No. PCT/SE2018/050013 dated Apr. 26, 2018, 11 pages.

Ericsson, "Methods for UE Steering and Idle Mode Load Balancing in LTE," 3GPP TSG-RAN WG2 Meeting #59-bis, Shanghai, China Oct. 8-12, 2007, R2-074198, 4 pages.

\* cited by examiner

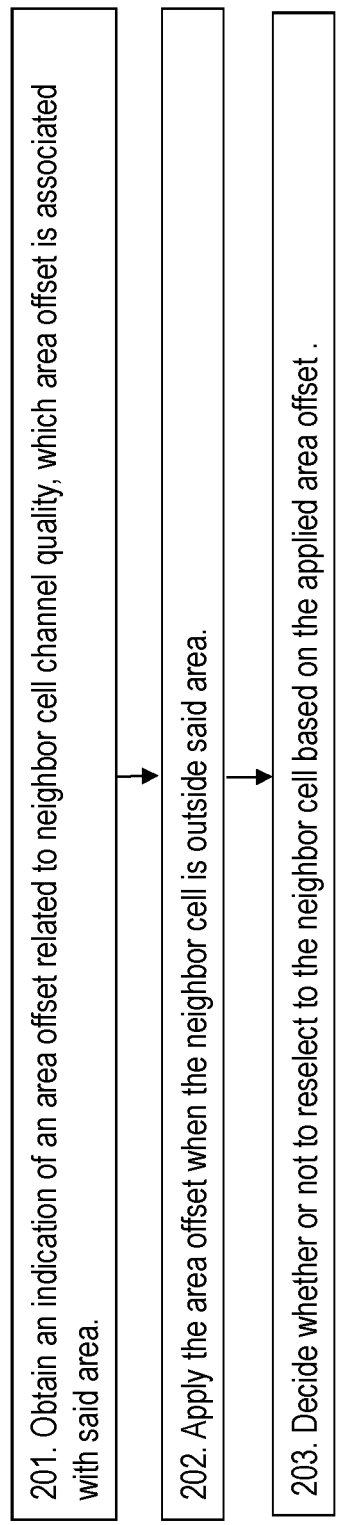
Fig. 2a Method in wireless device 120

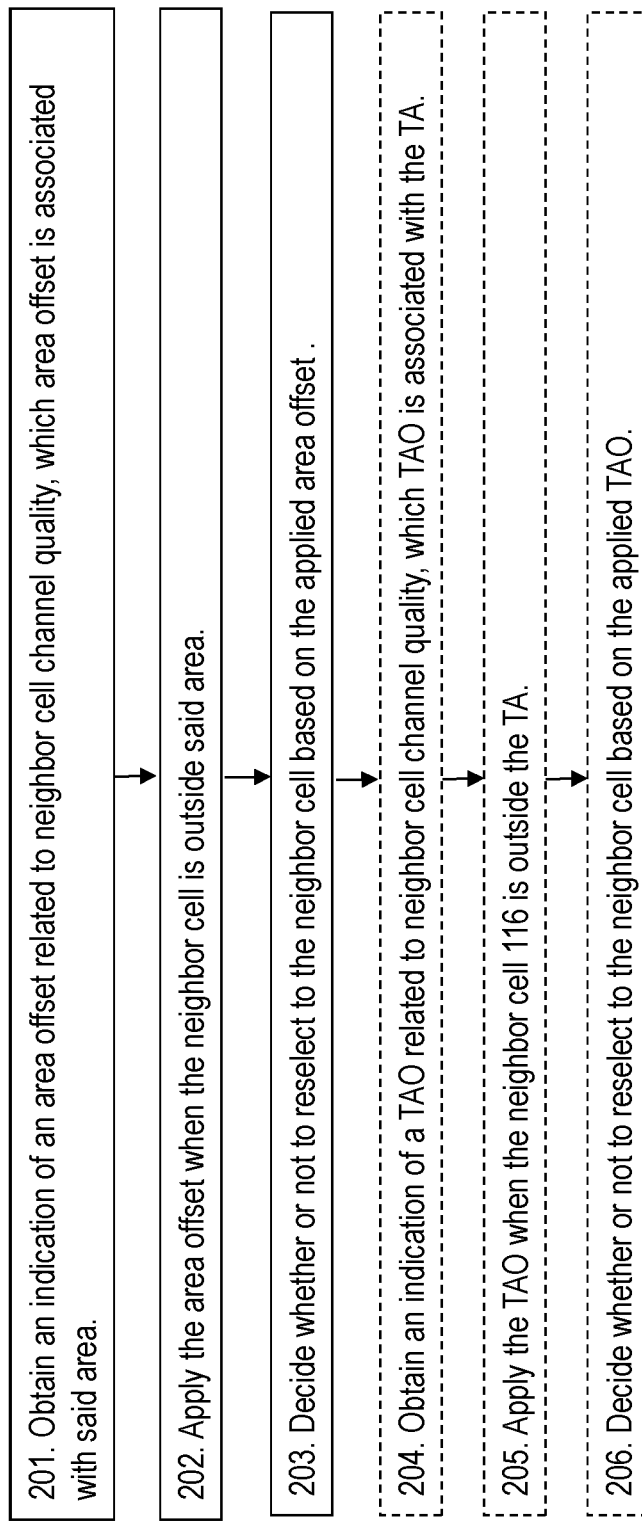
Fig. 2b  Method in wireless device 120

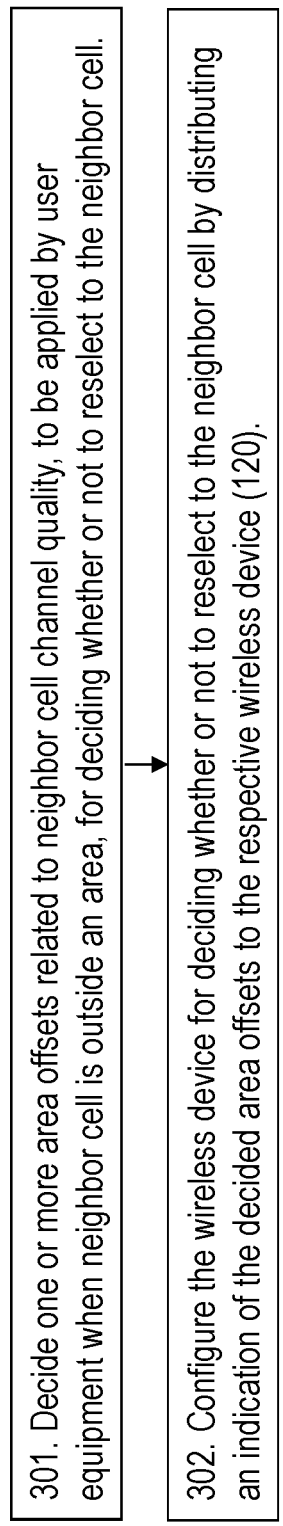
Fig. 3a  Method in network node 110

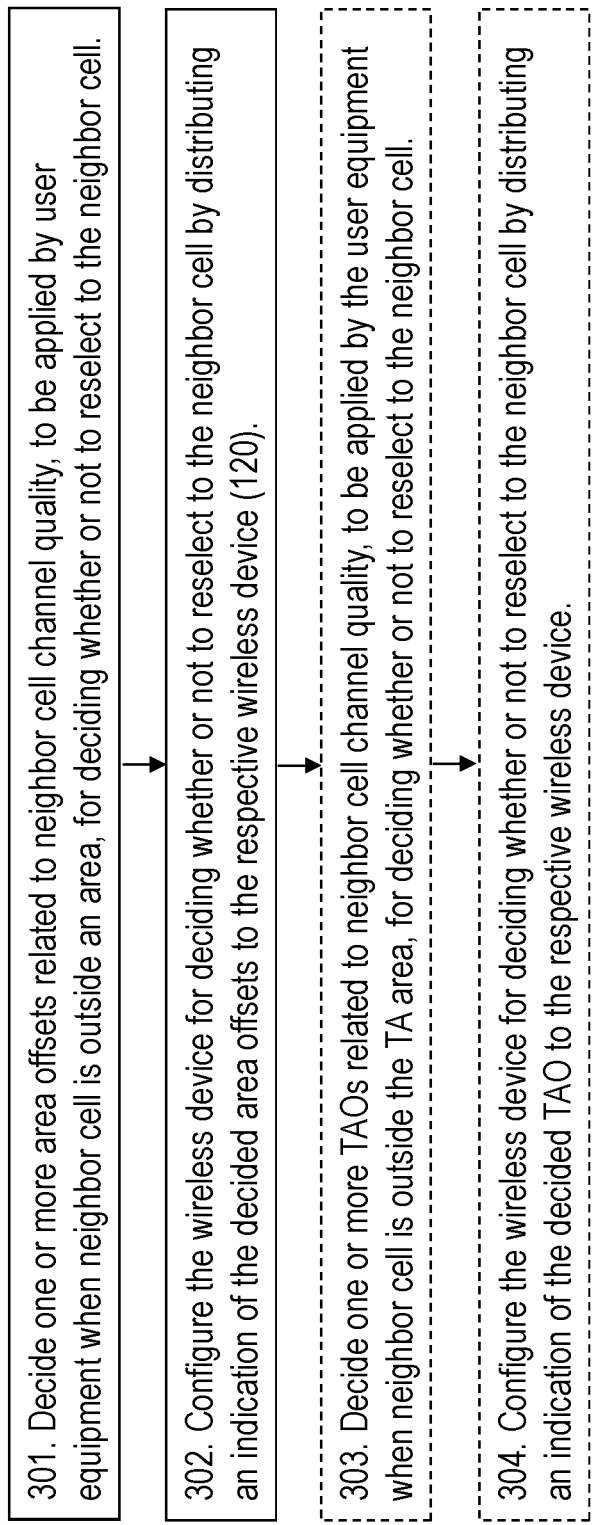
Fig. 3b  Method in network node 110

METHOD FOR NEIGHBOUR CELL RESELECTION WITH AN AREA OFFSET VALUE

CROSS REFERENCE TO RELATED APPLICATIONS

This application is a 35 U.S.C. § 371 national stage application of PCT International Application No. PCT/SE2018/050013 filed on Jan. 9, 2018, which claims the benefit of U.S. Provisional Patent Application Ser. No. 62/452,377, filed on Jan. 31, 2017, the disclosures and content of which are incorporated by reference herein in their entireties.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Cell Specific Offset in LTE

In LTE Release 12, it was introduced the heterogeneous network (HetNet) scenario which comprised large macro cells and small pico cells in a largely overlay/overlapping manner.

The pico cells typically have significantly lower output power compared to the macro cells resulting in a smaller coverage areas.

When a UE selects which cell to use, either in connected mode (RRC_CONNECTED) or to camp on in idle (RRC_IDLE), the UE measures the cell-specific reference signal (CRS) of its serving cell and all neighboring cells. The UE then compares the power (RSRP) or the quality (RSRQ) of the reference signal from different cells. It is also possible to use a hysteresis in the comparison so that the neighboring cell has to be a configurable level better than the serving cell (e.g. neighbor cell is x dB better than serving cell). This threshold may be set dynamically based on e.g. the current traffic load of either cell.

In order to be able to load-balance between the macro cells and the pico cells despite the output power difference, it is also possible to include a cell-specific offset (CSO) where the measurement of each cell (either RSRP or RSRQ) is shifted a fixed number of dBs. This CSO is broadcasted in the system information block type 4 (SIB4).

RAN Based Notification Area

For New Radio (NR), currently being specified for 5G, it is proposed that a new Radio Resource Control (RRC) state will be introduced, where some of the agreements are with aspects relevant to this document is highlighted italic:

The agreements are captured in chairman notes made available in draft form at the end of the meeting and are formally published as a report during the subsequent meeting. During regular meetings (not-bis or ad hoc meetings), the agreements are captured in 38.804 (Study on New Radio Access Technology; Radio Interface Protocol Aspects, latest version v.0.4.0 from RAN2 #96 including agreements from RAN2 #94 and RAN2 #95).

RAN2 #94, also referred to as 3GPP TSG RAN WG2 Meeting #94 R2-164670 Report v2.0 for RAN2 #94 in Nanjing, China, May 23-27, 2016.

Agreements:

1. Study the introduction of a RAN controlled "state" characterised by, at least:

a/—UEs in RAN controlled state should incur minimum signalling, minimise power consumption, minimise resource costs in the RAN/CN making it possible to maximise the number of UEs utilising (and benefiting from) this state b/Able to start data transfer with low delay (as required by RAN requirements)

For Further Study (FFS) whether data transfer is by leaving the "state" or data transfer can occur within the "state"

FFS whether "state" translates to an RRC state

. . .

Potential characteristics of the RAN controlled "state" for study:

a/ the CN/RAN connection is maintained b/ AS context stored in RAN c/ Network knows the UE's location within an area and UE performs mobility within that area without notifying the network.

d/ RAN can trigger paging of UEs which are in the RAN controlled "inactive state"

e/ No dedicated resources

...

RAN2 #95, also referred to as 3GPP TSG RAN WG2 Meeting #95 R2-166054 Report v2.0 for RAN2 #95 in Gothenburg, Sweden, Aug. 22-26, 2016.

Agreement:

1. One UE has only one NR RRC state at one time.

2. The connection (both CP and UP) between RAN and Core should be maintained in the "new state"

FFS whether the "new state" can be transparent to Core.

3. For the UE in the "new state", a RAN initiated notification procedure should be used to reach UE. And the notification related parameters should be configured by RAN itself.

FFS how the notification will be transmitted (e.g. via a beam, broadcast, etc.)

4. For the UE in the "new state", RAN should be aware whenever the UE moves from one "RAN-based notification area" to another.

FFS how CN location updates and RAN updates interact, if needed

...

RAN2 #95bis, also referred to as 3GPP TSG RAN WG2 Meeting #95bis R2-167461 Draft Report v1.0 for RAN2 #95bis in Kaohsiung, Oct. 10-14, 2016.

Agreements:

1. Modelling will be concluded when functionality is understood (maybe in WI phase). For the scope of the study we will refer to RRC_INACTIVE.

2. A UE and at least 1 gNB should keep the AS context information in the RRC_INACTIVE state.

3. Limit number of radio network identifiers

4. In the RRC_INACTIVE state, a UE location can be known at the RAN based area level where that area may be a single cell or more than one cell. Area is determined by the network.

...

Agreements for IDLE:

1. In IDLE mode, UE performs cell selection and reselection on NR Cells.

2. Study how to derive a cell quality based on measurements.

To Summarize the Italic Marked Agreements:

The new state in NR is tentatively referred to as RRC_INACTIVE. A UE in RRC_INACTIVE state will be configured by the RAN with a UE specific area corresponding to one or multiple cells, and the UE only needs to inform the network if it moves outside of this area. If it remains within the area, the RAN will be able to page the UE, and the UE will be able to access the network quickly. This state should minimize the power consumption and minimize the signalling and enable fast transition to connected mode.

The strongest candidate for how to define a UE specific RAN based notification area is to provide the UE with a list of cells, i.e. a list of cell IDs. It has also been proposed in 3GPP to have broadcast RAN paging area identifiers, which should be seen as an alternative to using lists of cell IDs. Using a list of cell IDs a RAN based notification area may comprise an arbitrary set of cells. With the broadcast RAN paging area identifiers, on the other hand, the borders between the RAN areas are fixed and the same for all UEs. A UE specific RAN based notification area would in that case potentially be possible by providing the UE with a list of RAN paging area identifiers (similar to the tracking area list used in EPS/LTE).

SUMMARY

It is an object of embodiments herein to improve the performance of a communications network.

According to a first aspect of embodiments herein, the object is achieved by a method performed by a wireless device for deciding whether or not to reselect to a neighbor cell. The wireless device is associated with a first cell. The wireless device is further associated with an area, which area is related to any one or more out of: a Tracking Area, TA, multiple TAs, a Radio Access Network, RAN, area. The area comprises one or more cells including the first cell. The wireless device obtains an indication of an area offset related to neighbor cell channel quality. The area offset is associated with said area. The wireless device applies the area offset when the neighbor cell is outside said area. The wireless device then decides whether or not to reselect to the neighbor cell based on the applied area offset.

According to a second aspect of embodiments herein, the object is achieved by a method performed by a network node for configuring one or more wireless devices for deciding whether or not to reselect to a neighbor cell. Each wireless device is associated with a first cell and each wireless device is associated to an area. The area is related to any one or more out of: a Tracking Area, TA, multiple TAs. The area comprises one or more cells including the first cell. The network node decides one or more area offsets related to neighbor cell channel quality. The area offsets are to be applied by the respective one or more user equipments when the neighbor cell is outside said area, for deciding whether or not to reselect to the neighbor cell. The network node then configures the wireless device for deciding whether or not to reselect to the neighbor cell by distributing an indication of the decided area offset to the respective wireless device.

According to a third aspect of embodiments herein, the object is achieved by a wireless device for deciding whether or not to reselect to a neighbor cell. The wireless device is adapted to be associated with a first cell and the wireless device is further adapted to be associated with an area. The area is related to any one or more out of: a Tracking Area, TA, multiple TAs, a Radio Access Network, RAN, area, wherein said area is adapted to comprise one or more cells including the first cell. The wireless device is configured to:

Obtain an indication of an area offset, related to neighbor cell channel quality, which area offset is associated with said area, apply the area offset when the neighbor cell is outside said area, and decide whether or not to reselect to the neighbor cell based on the applied area offset.

According to a fourth aspect of embodiments herein, the object is achieved by a network node for configuring one or more wireless devices for deciding whether or not to reselect to a neighbor cell. Each wireless device is adapted to be associated with a first cell, and each wireless device is adapted to be associated with an area. The area is related to any one or more out of: a Tracking Area, TA, multiple TAs, wherein said area is adapted to comprise one or more cells including the first cell. The network node is configured to:

Decide one or more area, related to neighbor cell channel quality, which area offset is to be applied by the respective one or more user equipment when the neighbor cell is outside said area, for deciding whether or not to reselect to the neighbor cell, and configure the wireless device for deciding whether or not to reselect to the neighbor cell by distributing an indication of the decided area offset to the respective wireless device.

An advantage of embodiments herein is that the wireless device may be instructed to remain longer in a RAN area, even if it detects cells outside the RAN area which offer equal or even better channel quality. By having a configurable offset, the network node may decide how much better a cell outside the RAN area has to be compared to a cell inside the RAN area, before the RAN area is updated. This in turn results in an improved performance of a wireless communications network.

BRIEF DESCRIPTION OF THE DRAWINGS

Examples of embodiments herein are described in more detail with reference to attached drawings in which:

FIGS. 2a and b are a flowcharts depicting embodiments of a method in a wireless device.

FIG. 3a and b are a flowcharts depicting embodiments of a method in a network node.

DETAILED DESCRIPTION

Figure 1:
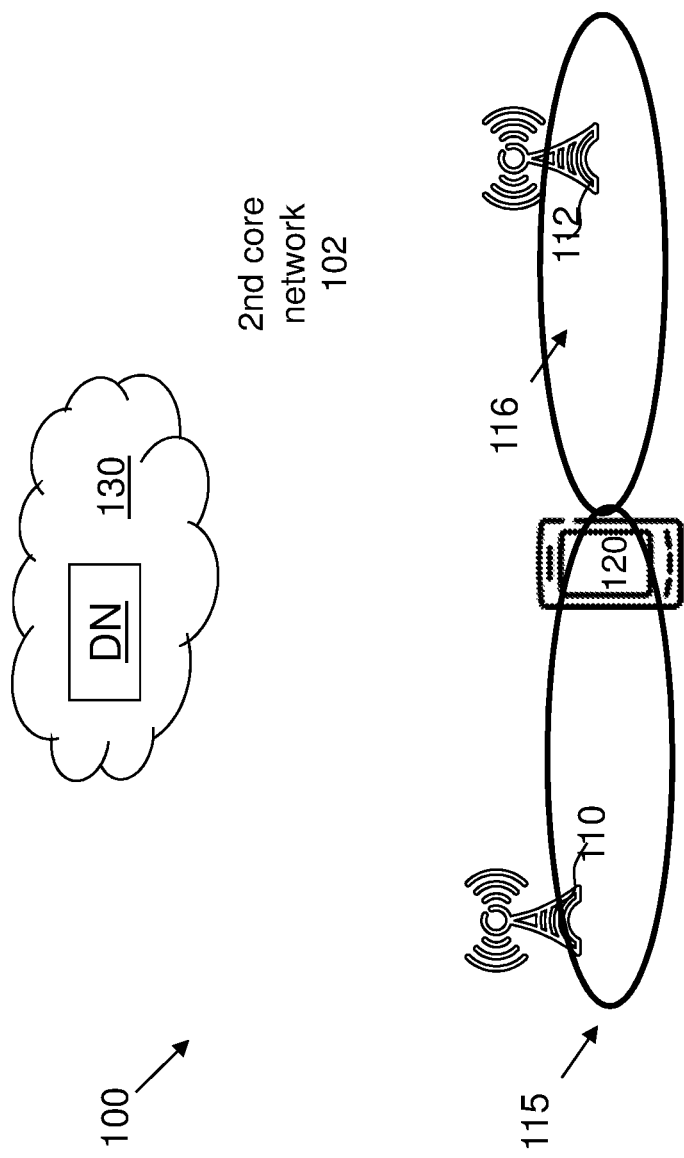
FIG. 1 is a schematic block diagram illustrating embodiments of a communications network.

As part of developing embodiments herein the inventors recognized a problem which first will be discussed.

As mentioned above, for NR, currently being specified for 5G, it is proposed that a new RRC state also referred to as RRC_INACTIVE will be introduced. Additionally, it is decided that for IDLE mode, the UE selects and re-selects NR cells. Even though it hasn't been decided yet that the same behaviour is applicable to RRC_INACTIVE, or if "IDLE mode" corresponds to both RRC_IDLE and RRC_I-NACTIVE, it is reasonable to assume that the UE will select and re-select NR cells in RRC_INACTIVE.

If a UE is near an edge of a RAN based notification area, also known as RAN area, regardless of how it is defined, it may measure on some cells that are within the RAN area and some cells that are outside. The wordings "RAN based notification area" and "RAN area" is used interchangeable herein. When applying the re-selection hysteresis and cell specific offsets, to compare the cell, the cell outside the RAN area may be "better" depending on selection criteria, this may be RSRP, RSRQ, or some other metric. The UE would then, possibly after some time-to-trigger delay, reselect to the cell outside the RAN based area which would result in an RAN area update with associated signaling. If the UE would then measure at a later time and the previous cell, inside the old RAN area would be better, the UE would re-select to that one.

If the channel qualities of the respective cells are similar and/or varying, e.g. fluctuating, fast, this may result in ping-pong cell re-selection, i.e. frequently changing back and forth between the cells. Typically, ping-pong cell re-selection is not a significant problem, but when this occurs at the border of the UE's RAN area, it will result in excessive signaling, consuming radio network resources as well as draining the UE's battery. Note that since RAN based notification areas are UE specific, this problem may occur at any cell border. If the RAN area of a UE after a cell re-selection across the border is adapted in a manner that both the new and the previous cell are included, then possible ping-pong cell re-selection will not result RAN area update signaling in addition to the already performed RAN area update. But even this RAN area update signaling is undesirable and consume control plane resources and UE battery. Furthermore, if fixed RAN paging areas are used and the operator opt for one-to-one mapping between RAN paging areas and RAN based notification areas, i.e. a UE's RAN based notification area always consists of a single RAN paging area, then ping-pong cell re-selection across a RAN paging area border will result in repeated RAN based notification area updates which are detrimental to the network and the UE's battery lifetime.

Since a RAN based notification area is UE specific and assumedly defined as a list of cells, a RAN based notification area border may coincide with any cell border. This makes the regular cell re-selection configurations, which are broadcast and applied on a per cell basis, unable to take RAN based notification areas into account.

Since the CSOs may be broadcasted, and applied by all UEs in the cell, while the RAN based notification area (RAN area) is UE specific, it will not be possible to use CSOs to distinguish between cells that are within the RAN area of a UE and cells that are outside. Thus, if a UE is at the border of its RAN area, re-selection to cells outside the RAN area are equally likely as re-selection to cells inside the RAN area.

Figure 6:
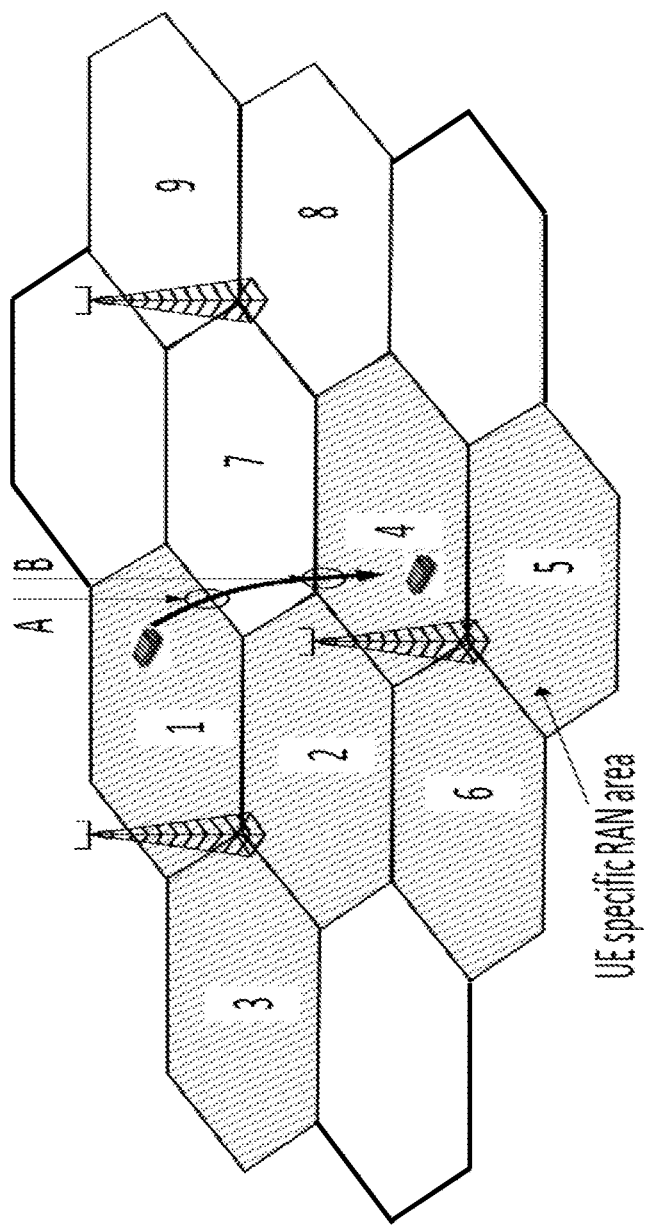
FIG. 6 is a schematic block diagram illustrating embodiments of a communications network.

FIG. 6 illustrates the communications network 100 where embodiments herein may be implemented. First, see this FIG. 6 to explain a scenario related to the problem when not using the embodiments herein, a UE mobility, in the form of cell re-selection, across the border of a RAN based notification area without the use of RAOs. In FIG. 6, there are 3 base stations shown, which each have 3 sectors, which is a typical LTE deployment and wherein each sector constitutes a cell, with a total of 9 cells, numbered 1-9. A UE initially in cell 1 is configured with a UE specific RAN based notification area (a.k.a. RAN area herein) comprising cells {1-6}. All other cells (either shown or not shown) are considered to be outside the UE's RAN area.

When the UE moves along the solid arrow it will experience two events:

Event A: Leaving cell 1 and entering cell 7.

Event B: Leaving cell 7 and entering cell 4.

Since the UE leaves the RAN area at event A it will need to perform a RAN area update resulting in network signaling. During the RAN area update, the UE will be configured with a new RAN area comprising at least the new cell, but may also comprise some or all of the cells in the previous RAN area. If the maximum number of cells in the RAN area is limited, it is likely that during the RAN area update, the cells furthest from the target cell are removed from the list, while cells the UE is likely to move to are added. One strategy the network may apply when allocating the UE specific RAN based notification area may be to include a group of cells, roughly forming a circle with the current (new) cell in the middle. The network may also choose to take other aspects into account, such as the UE category and/or the UE's recent mobility history, e.g. include more cells to form a larger RAN area for highly mobile UEs and/or adapt the shape of the RAN area to the trajectory of the UE, At event B, when the UE moves from cell 7 to cell 4, if the new RAN area comprises both cells 4 and 7, the UE will reselect to cell 4 without the need to perform a RAN area update, otherwise there will be a RAN area update at this cell border crossing too.

However, there may be limitations as to which cells may belong to the same RAN area. For instance, as the UE should be able to move between cells within the RAN area without notifying the network, it must be possible to retrieve the UE context between the RAN nodes once the UE performs RAN area update or resumes its connection in a cell belonging to a new RAN node. This requires that the necessary interface(s) is(are) in place, such as inter-RAN node interfaces (e.g. X2, gX2, eX2 or Xn).

Since the UE in the example of FIG. 6 shortly after leaving its original RAN area enters a cell that belonged to the original RAN area, i.e. the UE returns to the group of cells constituting the original RAN area, it would be beneficial, from a resource efficiency point of view, if the UE would remain in its original RAN area during the whole time or at least a longer time.

It is therefore an object of embodiments herein to further improve the performance of a communications network.

Embodiments herein relate to RAN based notification area specific offsets for reducing RAN area update signaling.

FIG. 1 depicts an example of a wireless communications network 100 in which embodiments herein may be implemented. The wireless communications network 100 implementing embodiments herein may comprise one or more RANs and one or more CNs. The wireless communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, such as tight interworking between LTE and 5G. However, embodiments are also applicable in further development of other existing wireless communication systems such as e.g. WLAN, WCDMA and LTE. The wireless communications network 100 may comprise wireless communications networks of a first type and a second type. The first type and the second type relates different generations of telecommunication networks, such a 4G wireless communications network and a 5G wireless communications network.

Network nodes 110, 112 operate in the wireless communication network 100. The network nodes 110, 112 providing radio coverage over a geographical area. The network nodes 110, 112 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a 5G base station such as a gNB, a base transceiver station, a radio remote unit, an Access Point Base Station, a base station router, a transmission arrangement of a radio base station, a stand-alone access point or any other network unit capable of communicating with a wireless device within the service area served by the network nodes 110, 112 depending e.g. on the first radio access technology and terminology used. The network nodes 110, 112 may be referred to as serving radio network nodes and communicates with a wireless device 120 with Downlink (DL) transmissions and Uplink (UL) transmissions from the wireless device 120. The network node 110 serves a first cell 115. The network node 112 serves a neighbor cell 116 to the first cell 115.

In the wireless communication network 100, radio nodes such as e.g. the wireless device 120 operate. The wireless device 120 may be a UE, mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The wireless device 120 is located in the first cell 115 and is moving towards the neighbor cell 116.

Methods for configuring one or more wireless devices 120 for deciding whether or not to reselect to a neighbor cell 116, is performed by the network node 110 and the wireless device 120. As an alternative, a Distributed Node (DN) and functionality, e.g. comprised in a cloud 130 as shown in FIG. 1, may be used for performing or partly performing the methods.

Embodiments herein provide an introduction of cell re-selection offsets that are UE specific and dynamically associated with any cell border that coincides with a UE's such as the wireless device 120 current RAN based notification area border. Such a cell re-selection offset is herein referred to as an area offsets, such as e.g. a RAN area offset (RAO) and a Tracking Are offsets (TAOs).

Note that the terms "UE" and "wireless device" are used interchangeably herein.

A UE specific area related to RAN, e.g. used by UEs in RRC_INACTIVE state such as e.g. the wireless device 120, may be referred to as [UE specific] RAN Notification Area (RNA) or [UE specific] RAN based Notification Area (RNA).

Building blocks of a [UE specific] RAN [based] Notification Area: a RNA may be formed by a list of cells or one or more RAN Areas, e.g. a list of RAN Areas, where each RAN Area may be identified by an identifier which is broadcast in each cell belonging to the RAN Area.

A Tracking Area (TA) may comprise a set of cells and an identifier identifying the TA is broadcast in each of those cells.

A UE such as the wireless device 120 may be assigned a list of Tracking Areas to be used in RRC_IDLE state, and possibly also in RRC_INACTIVE state.

In the following the area offset is exemplified as RAO, but it may also be applicable by TAO. With the RAN area specific, or RAN area border specific, offsets provided according to embodiments herein, i.e. RAOs, dynamic association to a UE's such as the wireless device's RAN area borders is possible in order to favor re-selection to cells inside the RAN area in relation to re-selection to cells outside the RAN area. The wireless device 120 may be provided with RAO configuration through broadcast, e.g. the system information, or using dedicated signaling, when configuring the RAN area, e.g. when transitioning from RRC_CONNECTED to RRC_INACTIVE state, or when performing a RAN area update. If provided through broadcast signaling, the RAO configuration would not be UE specific, but different RAO configurations may optionally be associated with different UE categories. Certain RAO usage conditions may also be configured, which to some extent would result in UE specificity.

A RAO may be generic in the sense that it is applied to all RAN area border crossing cell re-selection considerations or it may be cell specific, e.g. applicable to a certain cell, or cell border specific, e.g. applicable to cell re-selection consideration between two specific cells.

A UE such as the wireless device 120 will apply the RAO in addition to the cell specific offset and the re-selection hysteresis so that a cell outside the RAN area would have to be x dB better (or y times better, whichever metric is being used) than a cell inside the RAN area in order for the wireless device 120 to choose to re-select to it. This will avoid unnecessary RAN area update signaling, in particular in ping-pong cases.

An alternative option to reduce RAN area update signaling and avoid potential ping-ponging between RAN areas, would be to extend or change the RAN area once the wireless device 120 leaves the area, i.e. update the RAN area to include the new cell and a suitable number of cells around it. However, this is not always possible, as the new cell, or eNB/gNB, may not have an interface, such as e.g. X2 or Xn, to the old cell, or eNB/gNB, so that the RAN context cannot be fetched from the new cell.

In some embodiments below it may be assumed that a UE specific RAN based notification area is defined as a list of cells.

A flowchart depicting example embodiments of a method performed by the wireless device 120, for deciding whether or not to reselect to a neighbor cell 116, is depicted in FIG. 2a. FIG. 2b will be referred to in the end of this document. The method will be described in a general way first, followed by a more detailed description and exemplification and with further extensions and variations of the embodiments herein with. The wireless device 120 is associated with a first cell 115. The wireless device 120 is further associated with an area. The area is related to any one or more out of: A RAN area, a Tracking Area (TA), multiple TAs such as e.g. a list of TAs or working as one big UE specific TA, a UE specific RAN area, such as a RAN based Notification Area or a RAN Notification Area. Said area comprises one or more cells including the first cell 115.

The method comprises one or more of the following actions, which actions may be taken in any suitable order:

Action 201.

The wireless device 120 obtains an indication of an area offset such as a RAN Area Offset, RAO, or a Tracking Area Offset, TAO, related to neighbor cell channel quality, which area offset is associated with said area. E.g. the RAO is associated with the UE specific RAN area (e.g. a RAN Notification Area consisting of a list of cells or one or more RAN Areas) associated with the wireless device 120, and the TAO is associated with the Tracking Area, or list of Tracking Areas, associated with the wireless device 120.

The indication of the area offset may be obtained from the network node 110 in any one or more out of:

a broadcast of the indication of the area offset, a broadcast of the indication of the area offset with explicit command to the wireless device 120, dedicated signaling of an indication of a generic area offset, dedicated signaling of an indication of a cell specific area offset, and dedicated signaling of an indication of a cell border specific area offset.

Action 202.

The wireless device 120 applies the area offset such as e.g. the RAO or TAO when the neighbor cell 116 is outside said area such as e.g. the RAN area and/or Tracking Area or the UE specific RAN area, e.g. a RAN Notification Area consisting of a list of cells or one or more RAN areas, each identified by a RAN area specific identifier, or the list of Tracking Areas allocated to the wireless device 120.

As mentioned above, the area offset may comprise any one or more out of: a RAO and a TAO. In some embodiments, the wireless device 120 may apply the area offset when the neighbor cell 116 is outside said area by applying any one or more out of: the RAO and the TAO. This may mean that the wireless device 120 may apply the RAO or the TAO or both the RAO and TAO. When the cell border is TA+RA the wireless device may use TAO+RAO, other options are to use only the RAO, i.e. RAO may have precedence, or only TAO, i.e. TAO may have precedence.

The area offset may be represented by any one or more out of:

a generic area offset, e.g. RAO and/or TAO, a cell specific area offset, e.g. RAO and/or TAO, a cell border specific area offset, e.g. RAO and/or TAO, and a multi-valued area offset, e.g. RAO and/or TAO, and depending on UE characteristics of the wireless device 120, different area offsets, e.g. RAOs and/or TAOs, would be used.

For instance, the wireless device 120 may be configured with three different area offsets:

Area offset_1=x dB, area offset_2=y dB and area offset_3=0 dB, such as e.g.:

RAO_1=x dB, RAO_2=y dB and RAO_3=0 dB, and

TAO_1=x dB, TAO_1_2=y dB and TAO_1_3=0 dB,

E.g. a stationary wireless device 120 would use area offset_1. If the wireless device 120 would start moving moderately, it would start using area offset_2 which is another value. If the wireless device 120 starts moving fast, it starts using area offset_3, i.e. stop using the area offset. There may also be different area offset values for different UE categories, e.g. depending on the radio receiver capabilities, as described below. It may also depend on the battery status of the wireless device 120. Low on energy would imply more restrictive re-selection, i.e. even higher threshold to cross area border, in order to strive even further to avoid spending the energy of the wireless device 120 on signaling of area update to the network such as the network node 110.

Action 203.

The wireless device 120 then decides whether or not to reselect to the neighbor cell 116 based on the applied area offset such as e.g. the RAO and/or TAO.

In some embodiments, the deciding whether or not to reselect to a neighbor cell 116 comprises: When the channel quality of the neighbor cell 116 is of a threshold and the area offset better than the channel quality of the first cell 115, the wireless device 120 reselects to the neighbor cell 116. Else the wireless device 120 remains in the first cell 115. In some of these embodiments this means that when the sum of a value of the area offset and a value of the threshold (threshold+area offset) is better the channel quality of the first cell 115, the wireless device 120 reselects the neighbor cell 116. In some other of these embodiments this means that when the product of the value of the threshold and the value of the area offset (threshold*area offset) is better the channel quality of the first cell 115, the wireless device 120 reselects the neighbor cell 116. In other words, when the channel quality of the neighbor cell (116), modified by the area offset, is a threshold better than the channel quality of the first cell, the wireless device 120 reselects to the neighbor cell 116, where "modified" may be e.g. addition, subtraction, multiplication or division.

In some alternative embodiments, the deciding whether or not to reselect to a neighbor cell 116 comprises: When the channel quality of the neighbor cell 116 is a threshold, a Cell-Specific Offset (CSO) and the area offset, better than the channel quality of the first cell 115, the wireless device 120 reselects to the neighbor cell 116. Else the wireless device 120 remains in the first cell 115. In some of these embodiments this means that when the sum of a value of the threshold, a value of the CSO, and a value of the area offset (threshold+CSO+area offset) is better the channel quality of the first cell 115, the wireless device 120 reselects the neighbor cell 116. In some other of these embodiments this means that when the product of the value of the threshold, the value of the CSO, and a value of the area offset (threshold*CSO*area offset) is better the channel quality of the first cell 115, the wireless device 120 reselects the neighbor cell 116. In other words, when the channel quality of the neighbor cell (116), modified by the area offset, and the CSO is a threshold better than the channel quality of the first cell, the wireless device 120 reselects to the neighbor cell 116, where "modified" may be e.g. addition, subtraction, multiplication or division.

Example embodiments of a flowchart depicting embodiments of a method performed by a network node 110, for configuring one or more wireless devices 120 for deciding whether or not to reselect to a neighbor cell 116 is depicted in FIG. 3a. FIG. 3b will be referred to in the end of this document. As mentioned above, each wireless device 120 is associated with a first cell 115. Further, each wireless device 120 is associated to an area. The area is related to any one or more out of: a TA, multiple TAs such as e.g. a list of TAs or workings as one big UE specific TA. The area comprises one or more cells including the first cell 115.

The method will first be described in a general way followed by a more detailed and exemplified description with further extensions and variations.

Action 301

The network node 110 decides one or more area offsets, such as a RAN Area Offset, RAO, or a Tracking Area Offset, TAO, related to neighbor cell channel quality. The area offset is to be applied by the respective one or more user equipment 120 when the neighbor cell 116 is outside said area, for deciding whether or not to reselect to the neighbor cell 116. The one or more area offsets may be decided by local conditions, such as cell sizes, downlink transmit power in the concerned cells or interference tolerance by the network node 110, or wireless device specific aspects, such as wireless device category or wireless device capabilities, or the one or more area offsets may be associated with one or more usage conditions, such as the channel quality of the neighbor cell, the receiver capabilities of the wireless device 120, the movement speed of the wireless device 120 or the battery status of the wireless device 120, where the fulfillment of the usage condition may be evaluated by the wireless device 120.

The decided one or more area offsets may be represented by any one or more out of: A generic area offset, a cell specific area offset, a cell border specific area offset, a multi-valued area offset, and depending on UE characteristics and different area offsets would be used. The area offset may comprise any one or more out of: a RAO and a TAO.

For instance, the wireless device 120 is configured with 3 different area offsets: Area offset_1=x dB, area offset_2=y dB, and area offset_3=0 dB. A stationary wireless device 120 would use area offset_1. IF the wireless device 120 would start moving moderately, it would start using area offset_2 another value. If the wireless device 120 starts moving fast, it starts using area offset_3, i.e. stop using the area offset.

The indication of the area offset may be distributed to the wireless device 120 by any one or more out of: Broadcasting the indication of the area offset for all the one or more wireless devices 120, broadcasting the indication of the area offset with explicit command to the respective one or more wireless devices 120, dedicated signaling of an indication of a generic area offset, dedicated signaling of an indication of a cell specific area offset, and dedicated signaling of an indication of a cell border specific area offset.

Action 302

The network node 110 then configures the wireless device 120 for deciding whether or not to reselect to the neighbor cell 116 by distributing an indication of the decided area offset to the respective wireless device 120.

Embodiments herein such as mentioned above will now be further described and exemplified. The text below is applicable to and may be combined with any suitable embodiment described above.

Again, see FIG. 6. As mentioned above, since the UE in the example of FIG. 6 shortly after leaving its original RAN area enters a cell that belonged to the original RAN area, i.e. the UE returns to the group of cells constituting the original RAN area, it would be beneficial, from a resource efficiency point of view, if the UE would remain in its original RAN area during the whole time or at least a longer time.

To achieve this, embodiments herein introduce the above mentioned area offsets such as RAOs in this example, e.g. with dynamic association with cells or cell borders, to counteract unnecessary RAN area border crossings. When the UE, which is the wireless device 120 according to embodiments herein, is considering re-selection from a cell inside its RAN area to a cell outside the RAN area, such the RAO would be added to the re-selection threshold of the cell outside the RAN area. More formally, this may be expressed as follows:

---

If neighbor cell is inside RAN area
    If neighbor cell is better than serving cell + threshold + CSO
        Reselect to neighbor cell
    Else
        Remain in serving cell
Else, i.e. If neighbor cell is outside the RAN area the RAO shall be used
    If neighbor cell is threshold + CSO + RAN area offset better than serving cell.
        Reselect to neighbor cell
    Else
        Remain in serving cell

---

The RAO may be configured to be used:
only if neighbor cell is outside the RAN area;
only if neighbor cell is inside the RAN area
if neighbor cells is either inside or outside the RAN area.

For FIG. 6 illustrating an example scenario of the communications network 100 where embodiments herein may be implemented, the leftmost base station of the 3 base stations shown refers to the network node 110. In FIG. 6, the 3 base stations each have 3 sectors, which is a typical LTE deployment and each sector constitutes a cell, with a total of 9 cells, numbered 1-9. Here, cell 1 relates to the first cell 115 and cell 7 relates to the neighbor cell 116. The wireless device 120 is initially located in cell 1 and is configured with a UE specific RAN based notification area, a.k.a. RAN area herein comprising cells {1-6}. All other cells, either shown or not shown, are considered to be outside the wireless device's 120 RAN area.

For the scenario in FIG. 6, the RAO configurations may result in that the wireless device 120, instead of re-selecting from cell 1 to cell 7 to cell 4, would re-select from cell 1 to cell 2 to cell 4, or directly from cell 1 to cell 4. With this change of cell re-selection path, at least one, and possibly two RAN area update signaling procedures would be avoided, resulting in reduced radio network resource consumption and reduced battery consumption of the wireless device 120.

An advantage of embodiments herein is that the wireless device 120 may be instructed to remain longer in a RAN based notification area (RAN area), even if it detects cells outside the RAN area which offer equal or even better channel quality. By having a configurable offset such RAO and TAO, the wireless communications network 100 such as the network node 110 can decide how much better a cell outside the RAN area has to be compared to a cell inside the RAN area, before the RAN area is updated. An important advantageous aspect is that the offset such RAO and TAO based mechanism is not tied to a specific cell border, but rather dynamically adapts to the RAN based notification area configuration for each individual UE such as the wireless device 120.

An advantageous effect of embodiments herein is that it reduces the risk of unnecessary cell re-selection across a RAN based notification area border and thereby reduces the RAN area update signaling and potential ping-pong re-selection. The same applies to the TAO, where the wireless device 120 may remain longer within its registered TA list and avoid unnecessary signaling.

Distribution of RAO and/or TAO As the CSO is broadcast from the eNBs and/or gNBs, such as e.g. the network node 110 this value will be the same for all UEs and may not be changed dynamically.

The RAO and/or TAO, which may be UE specific and may be dynamically associated with cells inside and/or outside the UE's such as the wireless device's 120, UE specific RAN area, on the other hand may be distributed in several different ways:

1. Broadcasted RAO and/or TAU for all UEs

Each cell optionally broadcasts a RAO and/or TAO applicable to all neighboring cells which are located outside a UE's RAN based notification area and/or registered Tracking Area list, according to the UE's such as the wireless device's 120 RAN based notification area configuration and/or registered Tracking Area list. Note that this means that different UEs may apply the RAO and/or TAO to different neighbor cells, depending on the respective UE's RAN based notification area configuration and configured Tracking Area list. If there is no RAO and/or TAO broadcasted, the UEs may not apply any.

Optionally, the communications network 100 such as e.g. the network node 110 may broadcast different RAOs and/or TAOs for different categories of UEs. As another option, the communications network 100 may broadcast different RAOs and/or TAOs to be applied for different types of cells (outside the RAN area and/or Tracking Area). For instance, if considering to re-select to a certain candidate cell such as the neighbor cell 116, i.e. a cell that is a candidate target for cell re-selection, located outside the wireless device's 120 RAN area and/or Tracking Area, the wireless device 120 may apply different RAOs and/or TAOs depending on the type of cell the candidate is, e.g. a macro cell, a micro cell, a pico cell or a CSG cell. Similarly, as other options the communications network 100 such as e.g. the network node 110 may broadcast different RAOs and/or TAOs to be applied when re-selecting to different carrier frequency bands and/or RATs.

2. Broadcasted RAO and/or TAO with Explicit Command to UEs

This is the same as 1 Broadcasted RAO and/or TAO for all UEs, but in addition, when a UE such as the wireless device 120 transitions to RRC_INACTIVE or when its RAN area configuration is updated, e.g. during RAN area updates, it is instructed whether to use the broadcasted RAO and/or TAO or not.

3. Dedicated Signaling of Generic RAO

When a UE such as the wireless device 120 is configured with a RAN area, it is instructed with a RAO applicable to the entire RAN area and/or TAO applicable to the entire Tracking Area list. The instruction may come together with the configuration of the RAN area, e.g. when the UE such as the wireless device 120 transitions to RRC_INACTIVE or when it updates its RAN area configuration during e.g. RAN area updates, or it is instructed in a separate dedicated message. For the TAO, the instruction can apart from the situations listed for the RAO also come together with the transition to RRC_IDLE.

4. Dedicated Signaling of Cell Specific RAO and/or TAO

When the UE such as the wireless device 120 is configured with a RAN area comprising a list of cells, either when the wireless device 120 transitions to RRC_INACTIVE state or when it performs a RAN area update, each cell may be associated with a new cell specific RAO and/or TAO. There are two alternative principles for how to define a cell specific RAO and/or TAO, e.g. two types of cell specific RAOs and/or TAOs. The following is exemplified with RAO in RRC_INACTIVE but is also applicable for embodiments with TAO in RRC_INACTIVE and/or RRC_IDLE. With one alternative, type 1, a cell specific RAO is associated with a certain cell inside the wireless device's 120 current RAN area. With the other alternative, type 2, a cell specific RAO is associated with a certain cell outside, neighboring, the wireless device's 120 current RAN area. If all cells within the RAN area are configured with the same cell specific RAO of type 1, then the case will be the same as for 3, dedicated signaling of generic RAO. The same is valid if the same cell specific RAO of type 2 is associated with all the cells neighboring the wireless device's 120 current RAN area. However, e.g. if some of the RAO values differ, which may be configured as one generic RAO and some overriding cell specific RAOs, the wireless device 120 will take the cell specificity into account, which results in different behaviors for cell specific RAOs of type 1 and type 2.

An Example of a Behavior of Wireless Device's 120 when Using Cell Specific RAOs of Type 1:

The cell specific RAO is used when comparing the associated cell within the RAN area with any cell located outside the RAN area. Thus, there will be a UE specific offset and the wireless device 120 will be less likely to re-select to a cell outside the RAN area and preferentially remain in the current cell or re-select to a cell within the RAN area.

For instance, in FIG. 6, if cell 1 is associated with a RAO=6 dB, then, when the wireless device 120 considers re-selection from the first cell 115 to the neighbor cell 116, in this example of FIG. 6 from cell 1 to cell 7 (event A), it will compare cell 1 and cell 7 and apply a 6 dB offset to cell 7, i.e., disregarding possible CSO, cell 7 needs to be more than 6 dB stronger than cell 1 in order for the UE to select it. This increases the probability that the wireless device 120 re-selects to cell 2 instead of cell 7 or remains in cell 1. If the wireless device 120 doesn't re-select to cell 7, but instead re-selects to cell 2 or remains in cell 1, when it approaches cell 4 it will compare the signal of its current cell i.e. cell 1 or cell 2, with cell 4 and no RAO will be applied since both cell 4 and the wireless device's 120 current cell are located inside the wireless device's 120 current RAN area. In this scenario the use of RAO has made the wireless device 120 remain inside its RAN area during the entire movement illustrated in FIG. 6.

UE Behavior when Using Cell Specific RAOs of Type 2:

The cell specific RAO is used when comparing the associated cell outside the RAN area with any cell located inside the RAN area. Thus, there will be a UE specific offset and the wireless device 120 will be less likely to re-select to a cell outside the RAN area and preferentially remain in the current cell or re-select to a cell within the RAN area.

For instance, in FIG. 6, if cell 7 is associated with a RAO=6 dB, then, when the wireless device 120 considers re-selection from the first cell 115 to the neighbor cell 116, in this example of FIG. 6 from cell 1 to cell 7 (event A), it will compare cell 1 and cell 7 and apply a 6 dB offset to cell 7, i.e., disregarding possible CSO, cell 7 needs to be more than 6 dB stronger than cell 1 in order for the wireless device 120 to select it. And similar to the case of RAOs of type 1 above, if the wireless device 120 does not re-select to cell 7, it will later re-select to cell 4, directly from cell 1 or via cell 2, without applying any RAO. If the wireless device 120 reselects to the neighbor cell 116 outside the RAN area (i.e. cell 7), it will perform a RAN area update and discard the old RAO. If it should apply a new RAO, this will be provided during the RAN area update.

To Summarize Cell Specific RAOs of Type 1 and 2:

With the example of FIG. 6, the net result is apparently the same for both the cell specific RAO type 1 and the cell specific RAO type 2 cases. However, differences become apparent if involvement of other cells are considered too. With type 2 cell specific RAOs, the wireless device 120 would use the same RAO for cell 7 irrespective of which cell inside the wireless device's 120 RAN area, e.g. cell 1, 2 or 4, it compares with cell 7, while another cell specific RAO would be used if cell 7 is replaced by another cell, e.g. cell 8, in which case the cell specific RAO associated with cell 8 would be used. On the other hand, with type 1 cell specific RAOs, the wireless device 120 would use the same RAO irrespective of which cell outside the RAN area it is considering re-selection to, as long as the cell inside the RAN area that the wireless device 120 compares with is the same, while a change of the cell inside the RAN area would imply a change of cell specific RAO, although the cell specific RAOs of two cells may of course be the same.

Another aspect of cell specific RAO type 1 and cell specific RAO type 2 is the size of the list of RAOs. If cell specific RAO type 1 is used, then the list may comprise as many entries as there are cells within the RAN area that should have unique RAOs. If several cells within the RAN area should have the same RAO, then some form of grouping, e.g. a range of cell IDs, may be used. If cell specific RAO type 2 is used, then the list may comprise any cell outside the RAN area. Since not all cells outside the RAN area can be included, there are two alternatives for the wireless device 120 behavior if it detects a cell outside the RAN area without a cell specific RAO e.g. when the wireless device 120 is configured with some cell specific RAO type 2:

Type 2a:

Use a default RAO, which may be zero, when comparing cells inside the RAN area to cells outside the RAN area if there is no cell specific RAO type 2.

Type 2b:

The wireless device 120 is prohibited from re-selecting to a cell without a cell specific RAO type 2 outside the RAN area when the wireless device 120 is configured with some cell specific RAO type 2.

5. Dedicated Signaling of Cell Border Specific RAO and/or TAO

From each of the cells at the border of a wireless device's 120 RAN based notification area, the wireless device 120 may re-select to one or more cell(s) outside the wireless device's 120 RAN based notification area. For each of those potential re-selection alternatives the network may configure the wireless device 120 with a specific RAO. That is, the specific RAO is tied to a certain pair of source and target cell for a cell re-selection procedure resulting in that the wireless device 120 moves from a cell inside to a cell outside its RAN based notification area. As before, the configured RAO would be added to the re-selection threshold that has to be exceeded to trigger selection to the cell outside the RAN area.

Selective or Conditional RAOs

As already implied, RAOs and/or TAOs may be tailored for a specific UE such as the wireless device 120 or a specific type of UE which e.g. the wireless device 120 may be, or may be adapted to the wireless device's 120 capabilities or subscription properties. One example of such adaptation is to configure the wireless device 120 to apply the RAO and/or TAO conditionally, e.g. based on the channel quality. In some embodiments a conditional RAO and/or TAO is configured for UEs which cannot cope with as poor channel quality as regular UEs, a such UE may be the wireless device 120. This may for instance include simple, low-complexity UEs, such as certain MTC devices (e.g. low-cost sensor devices), which may have less capable receivers (e.g. poor receiver sensitivity). A UE's available transmit power can also impact the limit for how poor channel quality the UE can cope with. Again, a simple, low-complexity and low-cost MTC devices, with low-cost power amplifier (PA), may be one example of such a UE.

A side-effect of the use of RAO and/or TAO is that the wireless device 120 may re-select to, or remain in, a cell which has a worse channel quality than another cell available to the wireless device 120, because this other cell is located outside the wireless device's 120 RAN based notification area or TA and is artificially downgraded by the RAO and/or TAO. Although this may be acceptable for a regular UE, it may not always be acceptable for a UE such as the wireless device 120 with higher channel quality requirements. Hence, the network may configure such a UE to apply a RAO and/or TAO for a certain candidate cell (i.e. a cell the UE considers to re-select to) on condition that there is an alternative cell available to the UE (e.g. the current cell), which offers a channel quality above a certain minimum threshold. But if a channel quality above this threshold cannot be achieved when the RAO and/or TAO is applied in the cell re-selection procedure, the UE such as the wireless device 120 should disregard the RAO and re-select to the cell with the best actual channel quality. Optionally, the UE could be configured to use the same or similar condition also for application of the CSO.

RAO and/or TAO usage conditions, such as the one described above, may be signaled to the wireless device 120 using dedicated signaling, e.g. when the wireless device's 120 RAN based notification area or TA is configured. It may be applied to RAOs and/or TAOs configured via dedicated signaling or RAOs and/or TAOs configured via broadcast. A RAO and/or TAO usage condition may also be broadcast in a cell together with other RAO and/or TAO configuration data. This may include a condition for using the RAO and/or TAO usage condition, e.g. that only certain categories of MTC devices such as e.g. the wireless device 120 should apply the RAO and/or TAO usage condition, while other UEs should disregard it.

The wireless communications network 100 such as e.g. the network node 110 may use various information to determine whether a certain UE such as the wireless device 120 requires special RAO and/or TAO configuration, e.g. a usage condition, via dedicated signaling. The wireless communications network 100 such as e.g. the network node 110 may e.g. use information received from the wireless device 120, e.g. UE capability/category signaling, which e.g. may be signaled in conjunction with the attach procedure or may be requested from the wireless device 120 at a later time, or subscription information available in a subscription database.

Use of Embodiments Together with Fixed RAN Paging Areas Identified Through Broadcasted RAN Area Identifiers If fixed RAN paging areas are used, e.g. identified by broadcasted RAN paging area identifiers and the same for all UEs to form RAN areas similar to how Tracking Areas are defined, cell re-selection offsets counteracting RAN area and/or TA border crossings may in principle be achieved by suitable configuration of CSOs. However, if UE specific or UE category specific offsets and/or offset usage conditions are desired, then the embodiments described above may be used to provide the wireless device with suitable RAO and/or TAO configuration.

Use of Embodiments Herein in Idle State

Although embodiments herein are best suited for the inactive (RRC_INACTIVE) state, it may potentially be used also for a UE such as the wireless device 120 in idle (RRC_IDLE) state, in which case RAN area offsets would be replaced by Tracking Area offsets (TAOs). This means that in this case TAOs are preferred. In that case the TAO configuration may be provided by the RAN before the wireless device 120 is switched to RRC_IDLE state or by the core network e.g. by using NAS signaling, e.g. in a Tracking Area Update Accept message in conjunction with Tracking Area Updates. Since the RAN, at least in LTE, is not aware of the UE's such as the wireless device's 120 configured list of Tracking Areas and the core network is not aware of cell-to-Tracking Area mapping, the TAO configuration should preferably, to avoid increasing the complexity too much, be generic, such as e.g. not cell-specific, and tied to the external borders of a wireless device's list of Tracking Areas. This means that the wireless device 120 determines when to apply the TAO based on the Tracking Area Code in each measured cell, i.e. the wireless device 120 applies the TAO when a considered cell re-selection would cross an external border of the wireless device's list of Tracking Areas.

Alternative or Complementing Embodiment to Reduce RAN Area Update Signaling

A common method to reduce the occurrence of ping-ponging in conjunction with handover in connected state is to employ a time-to-trigger (TTT) which stipulates a minimum time during which a criterion need to be fulfilled before reacting to it. For instance, a neighbor cell could be required to be x dB, such as e.g. 3 dB, better than the serving cell during t-Reselection, e.g. 40 ms, before a UE sends a measurement report. If the criterion ceases to be fulfilled before the TTT expires, the timer is reset and no measurement report is transmitted. This prevents rapid fluctuations of the channel quality from triggering unnecessary reporting and consequent ping-pong handovers.

A similar approach may be applied also to cell re-selection for a UE such as the wireless device 120 in RRC_INACTIVE or RRC_IDLE state. In order to reduce the number of RAN area updates, and the potential prevalence of ping-ponging between RAN areas, the wireless device 120 may be configured with different TTT timers for cells within the RAN area and cells outside the RAN area. In the cell re-selection case, a TTT timer would stipulate the time a cell re-selection condition should remain fulfilled until the cell re-selection is triggered.

TTTs and RAOs may be used as alternative means to achieve a similar result and could also be used in combination with each other.

According to embodiments herein, the wireless communications network 100 such as the network node 110 may configure the wireless device 120 in inactive (RRC_INACTIVE)—or possibly idle (RRC_IDLE)—state with cell measurement offsets, to be applied during cell re-selection, which unfavor cell re-selection out of the wireless device's 120 RAN based notification area and increase the probability that a cell re-selection procedure at the border of the wireless device's 120 RAN based notification area results in that the wireless device 120 remains inside its configured RAN based notification area. This advantageously reduces the RAN area update signaling, in particular in ping-pong cases, thereby reducing the wireless communications network 100 resource consumption, interference and battery drainage of the wireless device 120. The configured offsets may be tied to the wireless device's 120 RAN based notification area borders, even if the RAN based notification area is a UE specific, dynamically allocated list of cells, such as freely selected by the wireless communications network 100. In one embodiment, the above mentioned configured offsets are replaced or complemented by timers governing how long a cell re-selection condition may remain fulfilled until the cell re-selection is triggered.

Figure 4:
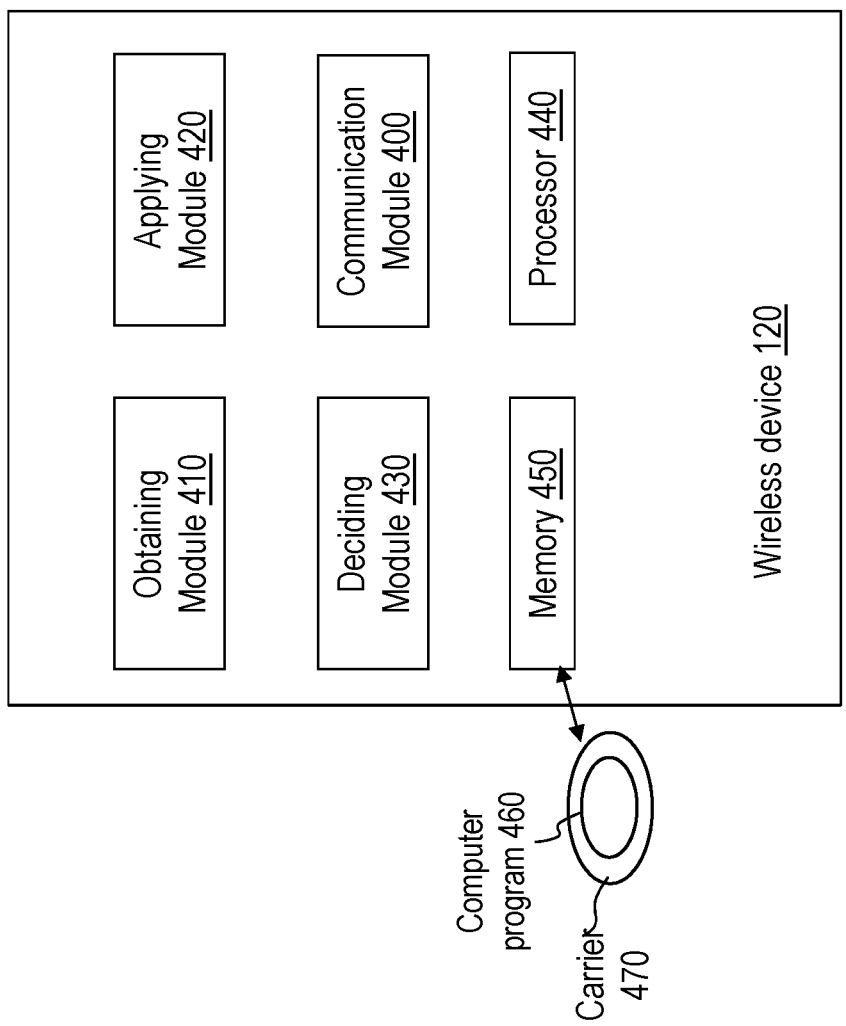
FIG. 4 is a schematic block diagram illustrating embodiments of a wireless device.

To perform the method actions of a method for deciding whether or not to reselect to a neighbor cell 116, the wireless device 120 may comprise the arrangement depicted in FIG. 4. The wireless device 120 is associated with a first cell 115, and which wireless device 120 is adapted to be associated with an area, which area is related to any one or more out of: a Tracking Area, TA, multiple TAs, working as one big UE specific TA, a Radio Access Network, RAN, area, wherein said area is adapted to comprise one or more cells including the first cell 115.

The the wireless device 120 may comprise a communication module 400 configured to communicate with the network node 110. The communication module 400 may comprise a wireless receiver and a wireless transmitter.

The wireless device 120 is configured to, e.g. by means of an obtaining module 410 in the wireless device 120, obtain an indication of an area offset such as a RAO, or a TAO, related to neighbor cell channel quality, which area offset is associated with said area. The area offset may be adapted to be represented by any one or more out of: A generic area offset, a cell specific area offset, a cell border specific area offset, a multi-valued area offset.

The indication of the area offset may be adapted to be obtained from a network node 110 in any one or more out of: A broadcast of the indication of the area offset, a broadcast of the indication of the area offset with explicit command to the wireless device 120, dedicated signaling of an indication of a generic area offset, dedicated signaling of an indication of a cell specific area offset, and dedicated signaling of an indication of a cell border specific area offset.

The wireless device 120 is configured to, e.g. by means of an applying module 420 in the wireless device 120, apply the area offset such as e.g. the RAO or TAO when the neighbor cell 116 is outside said area such as e.g. the RAN area and/or Tracking Area.

The wireless device 120 is further configured to, e.g. by means of the obtaining module 410 in the wireless device 120, decide whether or not to reselect to the neighbor cell 116 based on the applied area offset such as e.g. the RAO and/or TAO.

The wireless device 120 may further be configured to, e.g. by means of a deciding module 430 in the wireless device 120, decide whether or not to reselect to a neighbor cell 116 by: When the channel quality of the neighbor cell 116 is of a threshold and the area offset better than the channel quality of the first cell 115, reselect to the neighbor cell 116, else remain in the first cell 115.

The wireless device 120 may further be configured to, e.g. by means of the deciding module 430 in the wireless device 120, decide whether or not to reselect to a neighbor cell 116 by: When the channel quality of the neighbor cell 116 is a threshold, a Cell-Specific Offset, CSO, and the area offset, better than the channel quality of the first cell 115, reselect to the neighbor cell 116, else remain in the first cell 115.

In some embodiments, the area offset comprises any one or more out of: A RAO and a TAO. In these embodiments the wireless device 120 may further be configured to, e.g. by means of the applying module 420 in the wireless device 120, apply the area offset such as e.g. the RAO or TAO when the neighbor cell 116 is outside said area comprises applying any one or more out of: the RAO and the TAO.

Figure 5:
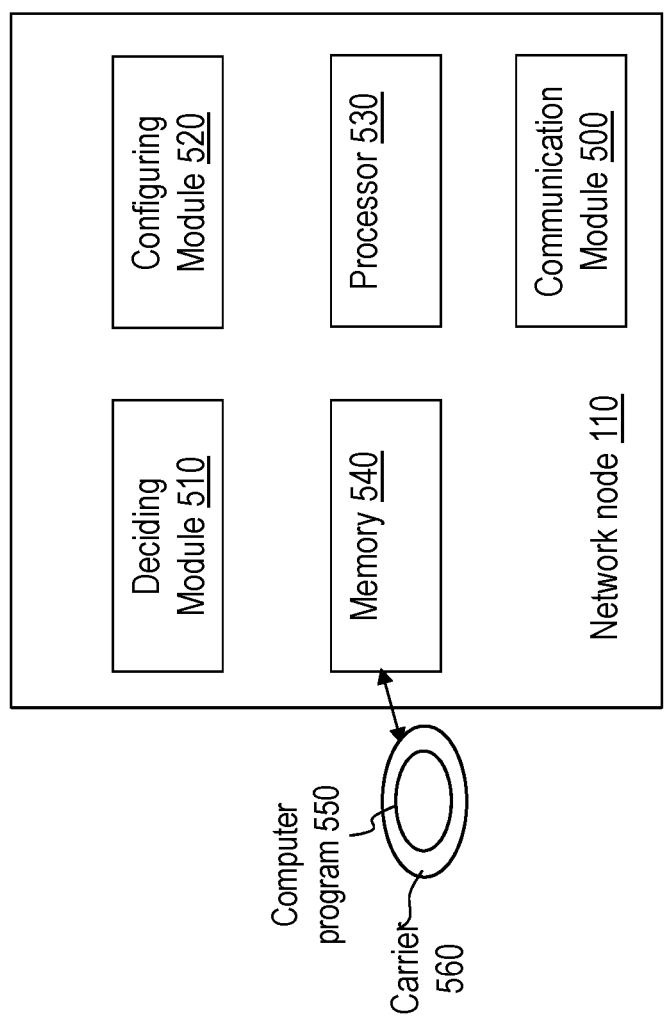
FIG. 5 is a schematic block diagram illustrating embodiments of a network node.

To perform the method actions for configuring the one or more wireless devices 120 for deciding whether or not to reselect to a neighbor cell 116, the network node 110 may comprise the arrangement depicted in FIG. 5. Each wireless device 120 is adapted to be associated with a first cell 115. Each wireless device 120 is further adapted to be associated with an area. The area is related to any one or more out of: A Tracking Area, TA, multiple TAs. The area is adapted to comprise one or more cells including the first cell 115.

The network node 110 may comprise an communication module 500 configured to communicate with the wireless device 120. The communication module 500 may comprise a wireless receiver not shown and a wireless transmitter.

The network node 110 is configured to e.g. by means of a deciding module 510 in the network node 110, decide one or more area offsets related to neighbor cell channel quality. The area offset is to be applied by the respective one or more user equipment 120 when the neighbor cell 116 is outside said area, for deciding whether or not to reselect to the neighbor cell 116. The area offset may comprise any one or more out of a RAO and a TAO. The decided area offset may be adapted to be represented by any one or more out of: A generic area offset, a cell specific area offset, a cell border specific area offset, a multi-valued area offset and depending on UE characteristics, different area offsets would be used.

The indication of the area offset may be adapted to be distributed to the wireless device 120 by any one or more out of: Broadcasting the indication of the area offset for all the one or more wireless devices 120, broadcasting the indication of the area offset with explicit command to the respective one or more wireless devices 120, dedicated signaling of an indication of a generic area offset, dedicated signaling of an indication of a cell specific area offset, and dedicated signaling of an indication of a cell border specific area offset.

The network node 110 is further configured to e.g. by means of a configuring module 520 in the network node 110, configure the wireless device 120 for deciding whether or not to reselect to the neighbor cell 116 by distributing an indication of the decided area offset to the respective wireless device 120.

The embodiments herein for deciding whether or not to reselect to a neighbor cell 116, the wireless device 120, and for configuring one or more wireless devices 120 for deciding whether or not to reselect to a neighbor cell 116, the network node 110, may be implemented through respective one or more processors, such as the processor 440 of a processing circuitry in the the wireless device 120 depicted in FIG. 3, and the one or more processors, such as the processor 530 of a processing circuitry in the the network node 110 depicted in FIG. 4 together with respective computer program code for performing the functions and actions of the embodiments herein. The program code mentioned above may also be provided as a computer program product, for instance in the form of a data carrier carrying computer program code for performing the embodiments herein when being loaded into the respective wireless device 120 and network node 110. One such carrier may be in the form of a CD ROM disc. It is however feasible with other data carriers such as a memory stick. The computer program code may furthermore be provided as pure program code on a server and downloaded to the respective wireless device 120 and network node 110.

The respective wireless device 120 and network node 110 may further comprise a memory 450, 540 comprising one or more memory units. The respective memory 450, 540 comprises instructions executable by the processor in the respective wireless device 120 and network node 110.

The respective memory 450, 540 is arranged to be used to store e.g. information about assigned resources, data, configurations, and applications to perform the methods herein when being executed in the respective wireless device 120 and network node 110.

In some embodiments, a respective computer program 460, 550 comprises instructions, which when executed by the respective at least one processor, cause the at least one processor 440, 530 of the respective wireless device 120 and network node 110 to perform actions above.

In some embodiments, a respective carrier 470, 560 comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the wireless device 120 and the network node 110, described above may refer to a combination of analog and digital circuits, and/or one or more processors configured with software and/or firmware, e.g. stored in the respective memory in the wireless device 120 and the network node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Below some example Embodiments 1-36 are described:
The following embodiments refer to FIG. 1 and FIG. 2b.

Embodiment 1

A method performed by a wireless device (120), for deciding whether or not to reselect to a neighbor cell (116), which wireless device (120) is associated with a first cell (115), and which wireless device (120) is associated with an area, which area is related to any one or more out of:

a Tracking Area, TA, multiple TAs, (such as e.g. a list of TAs or workings as one big UE specific TA), and a Radio Access Network, RAN, area, also referred to as a Core Network Area" (CNA) which when used herein refers to a UE specific area, i.e. a UE specific list of TAs, or a UE specific CNA.

wherein said area comprises one or more cells including the first cell (115), the method comprising:
  obtaining (201) an indication of an area offset (such as e.g. a RAN Area Offset, RAO, and/or a Tracking Area Offset, TAO), related to neighbor cell channel quality, which area offset is associated with said area, (such as e.g. any one or more out of the Tracking Area, TA, a common RAN areas and a UE specific RAN area. E.g. the RAO is associated with the RAN area associated with the wireless device (120),
  applying (202) the area offset (such as e.g. the RAO or TAO) when the neighbor cell (116) is outside said area (such as e.g. the RAN area and/or Tracking Area),
  deciding (203) whether or not to reselect to the neighbor cell (116) based on the applied area offset, such as e.g. the RAO and/or TAO.

Embodiment 2

The method according to embodiment 1, wherein deciding (203) whether or not to reselect to a neighbor cell (116) comprises:
  when the channel quality of the neighbor cell (116) is of a threshold and the RAO better (it may e.g. be a sum better: threshold+RAO. It may also be a product better (multiplication): threshold*RAO), reselecting to the neighbor cell (116),
  else remaining in the first cell (115).

Embodiment 3

The method according to embodiment 1, wherein deciding (203) whether or not to reselect to a neighbor cell (116) comprises:
  when the channel quality of the neighbor cell (116) is a threshold, a Cell-Specific Offset, CSO, and the RAO, better (it may e.g. be a sum better: threshold+RAO. It may also be a product better (multiplication): threshold*RAO, reselecting to the neighbor cell (116).
  else remaining in the first cell (115).

Embodiment 4

The method according to embodiment 1, wherein deciding (203) whether or not to reselect to a neighbor cell (116) comprises:
  when the channel quality of the neighbor cell (116) is a threshold and the RAO better than the channel quality of the first cell (115) (it may e.g. be a sum better: threshold+RAO. It may also be a product better (multiplication): threshold*RAO, reselecting to the neighbor cell (116),
  else remaining in the first cell (115).

Embodiment 5

The method according to embodiment 1, wherein deciding (203) whether or not to reselect to a neighbor cell (116) comprises:
  when the channel quality of the neighbor cell (116) is a threshold, a Cell-Specific Offset, CSO, and the RAO better than the channel quality of the first cell (115) (it may e.g. be a sum better: threshold+RAO. It may also be a product better (multiplication): threshold*RAO, reselecting to the neighbor cell (116),
  else remaining in the first cell (115).

Embodiment 6

The method according to any of the embodiments 1-5, wherein the wireless device (120) further is associated with a Tracking Area, TA, (or multiple TAs, working as one big UE specific TA), comprising one or more cells including the first cell (115), the method further comprising:
  obtaining (204) an indication of a Tracking Area Offset, TAO, related to neighbor cell channel quality, which TAO is associated with the TA,
  applying (205) the TAO when the neighbor cell (116) is outside the TA,
  (E.g., when a border is only RA wireless device (120) may have both TAO and RAO but uses the RAO, when the border is a TA+RA, the wireless device (120) uses TAO+RAO. In idle wireless device (120) would only have the TAO.)
  deciding (206) whether or not to reselect to the neighbor cell (116) based on the applied TAO.

It should be noted that in LTE and 5G a UE such as the wireless device 120 is provided with a UE-specific list of Tracking Areas and it will inform the network only when it moves out of the TAs in the list. Hence, in principle, on the TA level a UE may always be configured with a UE specific area. The wireless communications network may of course choose to make this list contain only one TA and/or use the same list for multiple UEs, but in principle the list is UE specific. In some embodiments, the TAO is applied only when the re-selection consideration concerns a cell borders which also constitutes a border of the UE's list of TAs, i.e. it should not be applied to a border between two TAs which are both included in the UEs list of TAs. This is to clarify when dedicated signalling is used to transfer/configure the TAO(s) in the wireless device 120, but when the TAO is included in broadcast system information, it may be clarified that even though a TAO may be specific to a cell and/or a TA, it may not be applied unless the re-selection concerns a border of the UE's specific list of TAs. The term "Core Network Area" (CNA) used herein refers to a UE specific area, i.e. a UE specific list of TAs, or a UE specific CAN.

Embodiment 7

The method according to any of the embodiments 1-6, wherein the RAO is represented by any one or more out of:
  a generic RAO,
  a cell specific RAO and
  a cell border specific RAO
  a multi-valued RAO and depending on UE characteristics, different RAOs would be used.

(For instance:

The wireless device (120) is configured with 3 different RAO
  RAO_1=x dB
  RAO_2=y dB
  RAO_3=0 dB)

(And a stationary wireless device (120) would use RAO_1. IF the wireless device (120) would start moving moderately, it would start using RAO_2 (another value). If the wireless device (120) starts moving fast, it starts using RAO_3, i.e. stop using the RAO.)

Embodiment 8

The method according to any of the embodiments 1-7, wherein the indication of the RAO is obtained from a network node (110) in any one or more out of:
  a broadcast of the indication of the RAO,
  a broadcast of the indication of the RAO with explicit command to the wireless device (120),
  dedicated signaling of an indication of a generic RAO,
  dedicated signaling of an indication of a cell specific RAO, and
  dedicated signaling of an indication of a cell border specific RAO.

Embodiment 9

The method according to according to any of the embodiments 6-8, wherein the TAO is represented by any one or more out of:
  a generic TAO,
  a cell specific TAO and
  a cell border specific TAO
  a multi-valued TAO and depending on UE characteristics, different TAOs would be used.

(For instance:
The wireless device (120) is configured with 3 different TAO
  TAO_1=x dB
  TAO_2=y dB
  TAO_3=0 dB)

(And a stationary wireless device (120) would use TAO_1. IF the wireless device (120) would start moving moderately, it would start using TAO_2 (another value). If the wireless device (120) starts moving fast, it starts using TAO_3, i.e. stop using the TAO.)

Embodiment 10

The method according to any of the embodiments 6-9, herein the indication of the TAO is obtained from a network node (110) in any one or more out of:
  a broadcast of the indication of the TAO,
  a broadcast of the indication of the TAO with explicit command to the wireless device (120),
  dedicated signaling of an indication of a generic TAO,
  dedicated signaling of an indication of a cell specific TAO, and
  dedicated signaling of an indication of a cell border specific TAO.

Embodiment 11

A computer program comprising instructions, which when executed by a processor, cause the processor to perform actions according to any of the embodiments 1-10.

Embodiment 12

A carrier comprising the computer program of embodiment 11, wherein the carrier is one of an electronic signal, an optical signal, an electromagnetic signal, a magnetic signal, an electric signal, a radio signal, a microwave signal, or a computer-readable storage medium.

The following embodiments refer to FIG. 1 and FIG. 3b.

Embodiment 13

A method performed by a network node (110), for configuring one or more wireless devices (120) for deciding whether or not to reselect to a neighbor cell (116), wherein each wireless device (120) is associated with a first cell (115), and wherein each wireless device (120) is associated to an area, which area is related to any one or more out of: a Tracking Area, TA, multiple TAs, such as e.g. a list of TAs or workings as one big UE specific TA, wherein said area comprises one or more cells including the first cell (115), the method comprising:
  deciding (301) one or more area offsets (such as a RAN Area Offset, RAO, or a Tracking Area Offset, TAO), related to neighbor cell channel quality, which area offset is to be applied by the respective one or more user equipment (120) when the neighbor cell (116) is outside said area, for deciding whether or not to reselect to the neighbor cell (116),
  configuring (302) the wireless device (120) for deciding whether or not to reselect to the neighbor cell (116) by distributing an indication of the decided area offset to the respective wireless device (120).

Embodiment 14

The method according to embodiment 13, wherein the decided RAO is represented by any one or more out of:
  a generic RAO,
  a cell specific RAO and
  a cell border specific RAO.

Embodiment 15

The method according to any of the embodiments 13-14, wherein the indication of the RAO is distributed to the wireless device (120) by any one or more out of:
  broadcasting the indication of the RAO for all the one or more wireless devices (120),
  broadcasting the indication of the RAO with explicit command to the respective one or more wireless devices (120)
  dedicated signaling of an indication of a generic RAO,
  dedicated signaling of an indication of a cell specific RAO
  dedicated signaling of an indication of a cell border specific RAO.

Embodiment 16

The method according to any of the embodiments 13-15, wherein the wireless device (120) further is associated with one or more Tracking Areas, TAs, the method further comprising,
  deciding (303) one or more TA Offset, TAO, related to neighbor cell channel quality, which TAO is to be applied by the respective one or more user equipment (120) when the neighbor cell (116) is outside the TAN area, for deciding whether or not to reselect to the neighbor cell (116), configuring (304) the wireless device (120) for deciding whether or not to reselect to the neighbor cell (116) by distributing an indication of the decided TAO to the respective wireless device (120).

Embodiment 17

The method according to any of the embodiments 13-16, wherein the TAO is represented by any one or more out of:
a generic TAO,
a cell specific TAO and
a cell border specific TAO
a multi-valued TAO and depending on UE characteristics, different TAOs would be used.
(For instance:
The wireless device (120) is configured with 3 different TAO
TAO_1=x dB
TAO_2=y dB
TAO_3=0 dB)
(And a stationary wireless device (120) may use TAO_1. IF the wireless device (120) would start moving moderately, it may start using TAO_2 (another value). If the wireless device (120) starts moving fast, it starts using TAO_3, i.e. stop using the TAO.)

Embodiment 18

The method according to any of the embodiments 16-17, wherein the indication of the TAO is obtained from a network node (110) in any one or more out of:
a broadcast of the indication of the TAO,
a broadcast of the indication of the TAO with explicit command to the wireless device (120),
dedicated signaling of an indication of a generic TAO,
dedicated signaling of an indication of a cell specific TAO, and
dedicated signaling of an indication of a cell border specific TAO.

Embodiment 19

A computer program comprising instructions, which when executed by a processor, cause the processor to perform actions according to any of the embodiments 13-18.

Embodiment 20

A carrier comprising the computer program of embodiment 19, wherein the carrier is one of an electronic signal, an optical signal, an electromagnetic signal, a magnetic signal, an electric signal, a radio signal, a microwave signal, or a computer-readable storage medium.

To perform the method actions for deciding whether or not to reselect to a neighbor cell (116), the wireless device (120), may comprise the following arrangement described below and depicted in FIG. 4.

Embodiment 21

A wireless device (120), for deciding whether or not to reselect to a neighbor cell (116), which wireless device (120) is associated with a first cell (115), and which wireless device (120) is adapted to be associated with an area, which area is related to any one or more out of: a Tracking Area, TA, multiple TAs, (such as e.g. a list of TAs or workings as one big UE specific TA), a Radio Access Network, RAN, area, wherein said area is adapted to comprise one or more cells including the first cell (115), the wireless device being configured to:
obtain an indication of an area offset (such as a RAN Area Offset, RAO, or a Tracking Area Offset, TAO), related to neighbor cell channel quality, which area offset is associated with said area, (such as e.g. the Tracking Area, TA a common RAN areas and a UE specific RAN area. E.g. the RAO is associated with the RAN area associated with the wireless device (120),
apply the area offset (such as e.g. the RAO or TAO) when the neighbor cell (116) is outside said area (such as e.g. the RAN area and/or Tracking Area),
decide whether or not to reselect to the neighbor cell (116) based on the applied area offset such as e.g. the RAO and/or TAO.

Embodiment 22

The wireless device (120) according to embodiment 21, wherein wireless device (120) further is configured to decide, e.g. by means of the deciding module, whether or not to reselect to a neighbor cell (116) by:
when the channel quality of the neighbor cell (116) is of a threshold and the RAO better (it may e.g. be a sum better: threshold+RAO. It may also be a product better (multiplication): threshold*RAO), reselect to the neighbor cell (116),
else remain in the first cell (115).

Embodiment 23

The wireless device (120) according to embodiment 21, wherein wireless device (120) further is configured to decide, e.g. by means of the deciding module, whether or not to reselect to a neighbor cell (116) by:
when the channel quality of the neighbor cell (116) is a threshold, a Cell-Specific Offset, CSO, and the RAO, better (it may e.g. be a sum better: threshold+RAO. It may also be a product better (multiplication): threshold*RAO, reselect to the neighbor cell (116).
else remain in the first cell (115).

Embodiment 24

The wireless device (120) according to embodiment 21, wherein wireless device (120) further is configured to decide e.g. by means of the deciding module, whether or not to reselect to a neighbor cell (116) by:
when the channel quality of the neighbor cell (116) is a threshold and the RAO better than the channel quality of the first cell (115) (it may e.g. be a sum better: threshold+RAO. It may also be a product better (multiplication): threshold*RAO, reselect to the neighbor cell (116),
else remain in the first cell (115).

Embodiment 25

The wireless device (120) according to embodiment 21, wherein wireless device (120) further is configured to decide e.g. by means of the deciding module, whether or not to reselect to a neighbor cell (116) by:
when the channel quality of the neighbor cell (116) is a threshold, a Cell-Specific Offset, CSO, and the RAO better than the channel quality of the first cell (115) (it may e.g. be a sum better: threshold+RAO. It may also be a product better (multiplication): threshold*RAO, reselect to the neighbor cell (116),
else remain in the first cell (115).

Embodiment 26

The wireless device (120) according to any of the embodiments 21-25, wherein the wireless device (120) further is adapted to be associated with a Tracking Area, TA, (or e.g. multiple TAs, works as one big TA), comprising one or more cells including the first cell (115), the wireless device (120) further being configured to:

obtain e.g. by means of the obtaining module, an indication of a Tracking Area Offset, TAO, related to neighbor cell channel quality, which TAO is associated with the TA, apply e.g. by means of the applying module, the TAO when the neighbor cell (116) is outside the TA, and (E.g. when a border is only RA wireless device (120) may have both TAO and RAO but uses the RAO, when the border is a TA+RA, the wireless device (120) uses TAO+RAO. In idle wireless device (120) would only have the TAO.)

decide e.g. by means of the deciding module, whether or not to reselect to the neighbor cell (116) based on the applied TAO.

Embodiment 27

The wireless device (120) according to any of the embodiments 21-26, wherein the RAO is adapted to be represented by any one or more out of:

a generic RAO, a cell specific RAO and a cell border specific RAO a multi-valued RAO and depending on UE characteristics, different RAOs would be used (For instance: The wireless device (120) may configured with 3 different RAO RAO_1=x dB RAO_2=y dB RAO_3=0 dB)

(And e.g. a stationary wireless device (120) would use RAO_1. IF the wireless device (120) would start moving moderately, it would start using RAO_2 (another value). If the wireless device (120) starts moving fast, it starts using RAO_3, i.e. stop using the RAO.)

Embodiment 28

The wireless device (120) according to any of the embodiments 21-27, wherein the indication of the RAO is adapted to be obtained from a network node (110) in any one or more out of:

a broadcast of the indication of the RAO, a broadcast of the indication of the RAO with explicit command to the wireless device (120), dedicated signaling of an indication of a generic RAO, dedicated signaling of an indication of a cell specific RAO, and dedicated signaling of an indication of a cell border specific RAO.

Embodiment 29

The wireless device (120) according to according to any of the embodiments 26-28, wherein the TAO is adapted to be represented by any one or more out of:

a generic TAO, a cell specific TAO and a cell border specific TAO a multi-valued TAO and depending on UE characteristics, different TAOs would be used.

(For instance: The wireless device (120) is configured with 3 different TAO

TAO_1=x dB

TAO_2=y dB

TAO_3=0 dB)

(And e.g. a stationary wireless device (120) would use TAO_1. IF the wireless device (120) would start moving moderately, it would start using TAO_2 (another value). If the wireless device (120) starts moving fast, it starts using TAO_3, i.e. stop using the TAO.)

Embodiment 30

The wireless device (120) according to any of the embodiments 26-29, wherein the indication of the TAO is adapted to be obtained from a network node (110) in any one or more out of:

a broadcast of the indication of the TAO, a broadcast of the indication of the TAO with explicit command to the wireless device (120), dedicated signaling of an indication of a generic TAO, dedicated signaling of an indication of a cell specific TAO, and dedicated signaling of an indication of a cell border specific TAO.

To perform the method actions for configuring one or more wireless devices (120) for deciding whether or not to reselect to a neighbor cell (116), the network node (110) may comprise the following arrangement described below and depicted in FIG. 5.

Embodiment 31

A network node (110), for configuring one or more wireless devices (120) for deciding whether or not to reselect to a neighbor cell (116), wherein each wireless device (120) is adapted to be associated with a first cell (115), and wherein each wireless device (120) is adapted to be associated with an area, which area is related to any one or more out of: a Tracking Area, TA, multiple TAs, such as e.g. a list of TAs or workings as one big UE specific TA, wherein said area is adapted to comprise one or more cells including the first cell (115), the network node (110) being configured to:

decide one or more area offsets (such as a RAN Area Offset, RAO, or a Tracking Area Offset, TAO), related to neighbor cell channel quality, which area offset is to be applied by the respective one or more user equipment (120) when the neighbor cell (116) is outside said area, for deciding whether or not to reselect to the neighbor cell (116), and configure the wireless device (120) for deciding whether or not to reselect to the neighbor cell (116) by distributing an indication of the decided area offset to the respective wireless device (120).

A network node (110), for configuring one or more wireless devices (120) for deciding whether or not to reselect to a neighbor cell (116), wherein each wireless device (120) e.g. is adapted to be associated with a first cell (115), and wherein each wireless device (120) is adapted to be associated to Radio Access Network, RAN, area comprising one or more cells including the first cell (115), the network node (110) being configured to:

decide e.g. by means of a deciding module, one or more RAN Area Offset, RAO, related to neighbor cell channel quality, which RAO is to be applied by the respective one or more user equipment (120) when the neighbor cell (116) is outside the RAN area, for deciding whether or not to reselect to the neighbor cell (116), and configure e.g. by means of a configuring module, the wireless device (120) for deciding whether or not to reselect to the neighbor cell (116) by distributing an indication of the decided RAO to the respective wireless device (120).

Embodiment 32

The network node (110) according to embodiment 31, wherein the decided RAO is adapted to be represented by any one or more out of:
a generic RAO,
a cell specific RAO and
a cell border specific RAO.

Embodiment 33

The network node (110) according to any of the embodiments 31-32, wherein the indication of the RAO is adapted to be distributed to the wireless device (120) by any one or more out of:
broadcasting the indication of the RAO for all the one or more wireless devices (120),
broadcasting the indication of the RAO with explicit command to the respective one or more wireless devices (120)
dedicated signaling of an indication of a generic RAO,
dedicated signaling of an indication of a cell specific RAO
dedicated signaling of an indication of a cell border specific RAO.

Embodiment 34

The network node (110) according to any of the embodiments 31-33, wherein the wireless device (120) further is adapted to be associated with one or more Tracking Areas, TAs, the network node (110) further being configured to:
decide e.g. by means of the deciding module, one or more TA Offset, TAO, related to neighbor cell channel quality, which TAO is to be applied by the respective one or more user equipment (120) when the neighbor cell (116) is outside the TAN area, for deciding whether or not to reselect to the neighbor cell (116), and
configure e.g. by means of a configuring module, the wireless device (120) for deciding whether or not to reselect to the neighbor cell (116) by distributing an indication of the decided TAO to the respective wireless device (120).

Embodiment 35

The network node (110) according to according to embodiments 34, wherein the TAO is adapted to be represented by any one or more out of:
a generic TAO,
a cell specific TAO and
a cell border specific TAO
a multi-valued TAO and depending on UE characteristics, different TAOs would be used.
(For instance: The wireless device (120) may configured with 3 different TAO
TAO_1=x dB
TAO_2=y dB
TAO_3=0 dB)
(And e.g. a stationary wireless device (120) would use TAO_1. IF the wireless device (120) would start moving moderately, it would start using TAO_2 (another value). If the wireless device (120) starts moving fast, it starts using TAO_3, i.e. stop using the TAO.)

Embodiment 36

The network node (110) according to any of the embodiments 34-35, wherein the indication of the TAO is adapted to be obtained from a network node (110) in any one or more out of:
a broadcast of the indication of the TAO,
a broadcast of the indication of the TAO with explicit command to the wireless device (120),
dedicated signaling of an indication of a generic TAO,
dedicated signaling of an indication of a cell specific TAO, and
dedicated signaling of an indication of a cell border specific TAO.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

ABBREVIATIONS

3GPP 3rd Generation Partnership Project
5G 5th Generation
a.k.a. Also known as
AS Access Stratum
CN Core Network
CAN 1 Core Network Area
CP Control Plane
CRS Cell-specific Reference Signal
CSG Closed Subscriber Group
CSO Cell Specific Offset
dB Decibel
EDGE Enhanced Data Rates for GSM Evolution
eNB Evolved NodeB
EPC Evolved Packet Core
EPS Evolved Packet System
eX2 A potential designation of the inter-RAN node (e.g. inter-gNB) interface in 5G/NR.
FFS For Further Study
GERAN GSM EDGE Radio Access Network
GSM Global System for Mobile communication
gX2 A potential designation of the inter-RAN node (e.g. inter-gNB) interface in 5G/NR.
HetNet Heterogeneous Network
ID Identity/Identifier
LTE Long Term Evolution
MTC Machine Type Communication
NAS Non Access Stratum
NR New Radio (Designates the 5G RAN in 3GPP.)
NG Next Generation
PA Power Amplifier
RAN Radio Access Network
RAT Radio Access Technology
RAO RAN Area Offset
RRC Radio Resource Control
RSRP Reference Signal Received Power
RSRQ Reference Signal Received Quality
SIB System Information Block
TA Tracking Area
TAO Tracking Area Offset
TR Technical Report TTT Time to Trigger/Time-to-Trigger
UE User Equipment
UP User Plane
UTRAN Universal Terrestrial Radio Access Network
WI Work Item
X2 The interface between two eNBs in LTE. An evolved version of this interface may be used between two RAN nodes, e.g. two gNBs, in 5G/NR.
Xn A potential designation of the inter-RAN node (e.g. inter-gNB) interface in 5G/NR.

The invention claimed is:

1. A method, performed by a wireless device, for determining whether to reselect to a neighbor cell, the method comprising:
obtaining an indication of an area offset related to neighbor cell channel quality, which area offset is associated with an area comprising one or more cells including a first cell of which the wireless device is associated with, wherein said area is related to one or more of a Tracking Area (TA), multiple TAs, and a Radio Access Network (RAN) area,
applying the area offset when the neighbor cell is outside said area and the wireless device is in an inactive state,
determining whether to reselect to the neighbor cell while the wireless device is in the inactive state based on the applied area offset.

2. The method according to claim 1, wherein determining whether to reselect to the neighbor cell while the wireless device is in the inactive state comprises:
determining to reselect the neighbor cell while the wireless device is in the inactive state when the channel quality of the neighbor cell is of a threshold and the area offset better than the channel quality of the first cell, and
determining to remain in the first cell while the wireless device is in the inactive state when the channel quality of the neighbor cell is not of a threshold and the area offset better than the channel quality of the first cell.

3. The method according to claim 1, wherein determining whether to reselect to the neighbor cell while the wireless device is in the inactive state comprises one of:
determining to reselect the neighbor cell while the wireless device is in the inactive state when the channel quality of the first cell does not exceed a combination of the channel quality of the neighbor cell that is above a threshold, a Cell-Specific Offset (CSO), and the area offset,
determining to remain in the first cell while the wireless device is in the inactive state when the channel quality of the first cell exceeds a combination of the channel quality of the neighbor cell that is above the threshold, the CSO, and the area offset.

4. The method according to claim 1, wherein the area offset comprises any one or more out of: a RAN Area Offset (RAO) and a Tracking Area Offset (TAO), and
wherein applying the area offset when the neighbor cell is outside said area and the wireless device is in the inactive state comprises applying one or more of the RAO and the TAO when the neighbor cell is outside said area and the wireless device is in the inactive state.

5. The method according to claim 1, wherein the area offset comprises
a multi-valued area offset comprising different area offsets to apply based on UE characteristics while the wireless device is in the inactive state.

6. The method according to claim 1, wherein obtaining the indication of the area offset from a network node comprises
receiving a broadcast of the indication of the area offset with explicit command to the wireless device.

7. A method performed by a network node, for configuring one or more wireless devices for determining whether to reselect to a neighbor cell, the method comprising:
determining one or more area offsets, related to neighbor cell channel quality, that is to be applied by the respective one or more wireless devices when the neighbor cell is outside of an area that the respective one or more wireless devices are associated with while the one or more wireless devices are in an inactive state, wherein said area is related to any one or more out of: a Tracking Area (TA), multiple TAs, and a Radio Access Network (RAN) area, said area comprises one or more cells including a first cell that each wireless device of the one or more wireless devices is associated with, and
configuring the one or more wireless devices to determine whether to reselect to the neighbor cell while the one or more wireless devices are in the inactive state by distributing an indication of the one or more area offsets to the respective one or more wireless devices.

8. The method according to claim 7, wherein the one or more area offsets comprises
a multi-valued area offset comprising different area offsets to apply based on UE characteristics while the one or more wireless devices are in the inactive state.

9. The method according to claim 7, wherein distributing the indication of the one or more area offsets the respective one or more wireless devices comprises
broadcasting the indication of the one or more area offsets with explicit command to the respective one or more wireless devices.

10. The method according to claim 7, wherein the area offset comprises any one or more out of: a RAN Area Offset (RAO) and a Tracking Area Offset (TAO).

11. A wireless device configured to determine whether to reselect to a neighbor cell, the wireless device comprising:
a processor;
a memory coupled to the processor, the memory comprising executable instructions that when executed by the processor causes the wireless device to operate to
obtain an indication of an area offset related to neighbor cell channel quality, which area offset is associated with an area comprising one or more cells including a first cell of which the wireless device is associated with, wherein said area is related to one or more of a Tracking Area (TA), multiple TAs, and a Radio Access Network (RAN) area,
apply the area offset when the neighbor cell is outside said area and the wireless device is in an inactive state,
determine whether to reselect to the neighbor cell while the wireless device is in the inactive state based on the applied area offset.

12. The wireless device according to claim 11, wherein the wireless device further operates to determine whether to reselect to the neighbor cell while the wireless device is in the inactive state by:
determining to reselect the neighbor cell while the wireless device is in the inactive state when the channel quality of the neighbor cell is of a threshold and the area offset better than the channel quality of the first cell, and
determining to remain in the first cell while the wireless device is in the inactive state when the channel quality of the neighbor cell is not of a threshold and the area offset better than the channel quality of the first cell.

13. The wireless device according to claim 11, wherein the wireless device further operates to determine whether to reselect to the neighbor cell while the wireless device is in the inactive state by one of:
  determining to reselect the neighbor cell while the wireless device is in the inactive state when the channel quality of the first cell does not exceed a combination of the channel quality of the neighbor cell that is above a threshold, a Cell-Specific Offset (CSO), and the area offset,
  determining to remain in the first cell while the wireless device is in the inactive state when the channel quality of the first cell exceeds a combination of the channel quality of the neighbor cell that is above the threshold, the CSO, and the area offset.

14. The wireless device according to claim 11, wherein the area offset comprises any one or more out of: a RAN Area Offset (RAO) and a Tracking Area Offset (TAO), and wherein the wireless device further is configured to
  apply one or more of the RAO and the TAO when the neighbor cell is outside said area and the wireless device is in the inactive state.

15. The wireless device according to claim 11, wherein the area offset comprises
  a multi-valued area offset comprising different area offsets to apply based on UE characteristics while the wireless device is in the inactive state.

16. The wireless device according to claim 11, wherein the wireless devices further operates to obtain the indication of the area offset from a broadcast of the indication of the area offset with explicit command to the wireless device received from a network node.

17. A network node configured to configure one or more wireless devices to determine whether to reselect to a neighbor cell, the network node comprising:
  a processor;
  a memory coupled to the processor, the memory comprising executable instructions that when executed by the processor causes the network node to operate to
  determine one or more area offsets, related to neighbor cell channel quality, that is to be applied by the respective one or more wireless devices when the neighbor cell is outside of an area that the respective one or more wireless devices are associated with while the one or more wireless devices are in an inactive state, wherein said area is related to any one or more out of: a Tracking Area (TA), multiple TAs, and a Radio Access Network (RAN) area, said area comprises one or more cells including a first cell that each wireless device of the one or more wireless devices is associated with, and
  configure the one or more wireless devices to determine whether to reselect to the neighbor cell while the one or more wireless devices are in the inactive state by distributing an indication of the one or more area offsets to the respective one or more wireless devices.

18. The network node according to claim 17, wherein the one or more area offsets comprises
  a multi-valued area offset comprising different area offsets to apply based on UE characteristics while the one or more wireless devices are in the inactive state.

19. The network node according to claim 17, wherein the network node further operates to distribute the indication of the area offset by
  broadcasting the indication of the area offset with explicit command to the respective one or more wireless devices.

20. The network node according to claim 17, wherein the area offset comprises any one or more out of: a RAN Area Offset (RAO) and a Tracking Area Offset (TAO).

* * * * *